United States Patent Office 3,085,074
Patented Apr. 9, 1963

3,085,074
AQUEOUS DISPERSIONS OF HALOGENATED, POLYMER MODIFIED BUTYL RUBBER, PROCESS OF MAKING SAME, AND VULCANIZATION THEREOF
Oliver W. Burke, Jr., Grosse Pointe, and Oscar M. Grace, Madison Heights, Mich.; said Grace assignor to said Burke
No Drawing. Filed Nov. 16, 1959, Ser. No. 853,018
25 Claims. (Cl. 260—3.5)

This invention relates particularly but not exclusively to methods of preparing halogenated polymer modified isoolefin-multiolefin interpolymers and aqueous dispersions, concentrated aqueous dispersions, and compoundings thereof and to the products obtained therefrom, including the vulcanizates thereof.

The present invention is more particularly concerned with the processes for producing halogenated polymer modified isoolefin-multiolefin interpolymers by halogenating with the aid of a halogenating agent polymer modified isoolefin-multiolefin interpolymers whereby chlorogroups, chloro- with other halogen groups, bromogroups, bromo- with other halogen groups and combinations of these groups are introduced into said polymer modified interpolymer and such processes and uses thereof include: (1) halogenation of said polymer modified interpolymer in bulk with the aid of a solid or low volatility liquid halogenating agent e.g., 1,3 dichloro-5,5, dimethyl hydantoin, (2) halogenation of said polymer modified interpolymer in small pieces or thin sheets with the aid of a gaseous or vaporous halogenating agent e.g. chlorine or bromine gas, (3) halogenation of said polymer modified interpolymer dispersed in an organic diluent with the aid of a solid, liquid or gaseous halogenating agent, (4) dispersion of the products from (1) and (2) above in an organic diluent, (5) the aqueous dispersion of the products of (3) and (4) above with water with the aid of an anionic or cationic or nonionic emulsifier and at least partially or completely removing the organic diluent, (6) the halogenation of an aqueous dispersion of said polymer modified interpolymer, (7) the polymer modification and halogenation of said isoolefin-multiolefin interpolymer in solid phase, (8) the polymer modification and halogenation of said interpolymer dispersed in a diluent, (9) the polymer modification and halogenation of an aqueous dispersion of said interpolymer, (10) the aqueous dispersion of the products of (7) and (8) above, (11) other combinations of the steps set forth in the processes described under (6) thru (9) above, (12) the processes set forth under (6) thru (9) above including the pre-step of forming the isoolefin-multiolefin interpolymer at low temperature e.g. below —100° F. with the aid of Friedel-Crafts catalyst in a diluent e.g. polymerizing isobutylene in major amounts with isoprene in minor amounts below —100° F. with the aid of anhydrous aluminum chloride. Further, this invention is concerned with the products including the products dispersed in an organic diluent and the products as aqueous dispersions from the processes set forth under (1) thru (12) above and these products include: (a) halogenated polymer modified isoolefin-multiolefin interpolymers, (b) such interpolymers dispersed in diluent, and (c) aqueous dispersions of such products.

This invention is further concerned with (13) the concentration of aqueous dispersions of the halogenated polymer modified isoolefin-multiolefin interpolymers to high solids 45 to 55% or higher polymer solids, especially with the aid of hydrophilic polymeric creaming agents and (c) with the products derived from such processes.

This invention is further concerned with compositions comprising said halogenated polymer modified isoolefin-multiolefin interpolymer aqueous dispersion (with or without concentration) together with one or more materials selected from the class of vulcanization aids for said interpolymer including the aqueous solutions, emulsions, dispersions or suspensions of such vulcanizing aids including phenoplasts including halogenated phenoplasts, aminoplasts including halogenated aminoplasts, other halogenated polymers consisting of halogenated polymers from conjugated dienes, halogenated polymers from conjugated dienes, and vinyls and halogenated natural rubber with or without the addition of other elastomers and/or plastomers, and with or without the addition of compounding ingredients and is concerned with vulcanizing the same to form vulcanizates.

STATE OF THE ART

The present invention of halogenation of polymer modified isoolefin-multiolefin interpolymers is clearly distinguishable from the prior art anhydrous halogenation of isoolefin-multiolefin interpolymers.

The anhydrous halogenation of isoolefin-multiolefin interpolymers with or without solvent is known to the patent art and set forth in U.S. Patents 2,631,984, 2,698,-041, 2,720,479, 2,732,354, 2,804,448, 2,809,372, 2,816,-098, 2,865,901, 2,857,357, and this invention teaches that polymer modified isoolefin-multiolefin interpolymers and aqueous dispersions of isoolefin-multiolefin interpolymers can be halogenated, that is, such polymer modified interpolymers can be halogenated and such halogenation may be effected even in the presence of the aqueous phase. The halogenation of this invention yields interpolymer products having not only halogen groups but also having the polymer modifying groups, whereas the anhydrous halogenation of interpolymers according to the prior patent art yields products having only halogen groups. The present invention yields aqueous dispersed products while the prior art yielded only anhydrous products. Thus the processes and the products of the present invention are clearly distinguished from those of the prior art in both process and product and the uses including the aqueous dispersions of this invention are in many applications distinct from the uses of the halogenated products of the prior art.

OBJECTS OF THE INVENTION

The invention aims to provide new and useful halogenated polymer modified isoolefin-multiolefin interpolymers, organic diluent and aqueous dispersions thereof, and concentrates of such aqueous dispersions. It also aims to provide processes for the production of such halogenated polymer modified interpolymers, as well as solvent and aqueous dispersions thereof. It also aims to provide useful vulcanizates of such halogenated polymer modified interpolymers and to provide vulcanizable compositions of such halogenated polymer modified interpolymers and especially vulcanizable compositions thereof with various vulcanization aids, such as phenoplasts, halogenated phenoplasts, aminoplasts, halogenated aminoplasts, halogen containing elastomers including halogenated elastomers, other elastomers and plastomers and various compounding ingredients. The invention further aims to provide halogenated polymer modified interpolymers compounded so as to provide vulcanizable compositions useful for forming molded articles and for film and fiber, and further to provide such products dispersed in an organic diluent or in an aqueous media for forming protective coatings and decorative applications, or for the coating of fibers and yarns of both synthetic and natural origins to protect such against deterioration and to impart elastic properties thereto. Other objects of this invention will become apparent from the more detailed description and the examples thereof, hereinafter set forth.

The polymer modified isoolefin-multiolefin interpolymers including aqueous dispersions employed in this invention can be prepared according to the following copending applications: U.S. application 626,782, filed December 6, 1956, by R. G. Jennen, entitled "Graft Olefin Polymers and Copolymers and Uses Thereof" (Case 19), and U.S. application Ser. No. 12,686, filed March 4, 1960, by R. G. Jennen, entitled "Polymer Modified Interpolymers and Uses Thereof" (Case 19D), and U.S. application Ser. No. 12,687, filed March 4, 1960, by R. G. Jennen, entitled "Interpolymer Aqueous Dispersions and Uses Thereof" (Case 19F), and British Patent No. 793,581, and as therein set forth, it will be apparent that in preparing the polymer modified isoolefin-multiolefin polymers, the monomer material is polymerized in the presence of an isoolefin-multiolefin interpolymer.

The isoolefin-multiolefin interpolymers which are polymer modified and then halogenated according to this invention include those isoolefin-multiolefin interpolymers known as "butyl rubbers" which are vulcanizable elastic interpolymers of isobutylene and small amounts of a diolefin such as, for example, isoprene and butadiene-1,3 (for further information regarding butyl rubber and its manufacture see R. J. Adams and E. J. Buckler's article entitled "Evolution and Application of Butyl" in the Transactions of the Institute of Rubber Industry, vol. 29, No. 1, February 1953, pages 17–31) and such interpolymers have been described in U.S. Patents 2,322,073, 2,356,128, 2,356,129, 2,356,130, 2,373,706, 2,384,975, 2,418,913 and others.

DEFINITION OF TERMS

The invention is concerned with the processes of preparing new halogenated polymer modified isoolefin-multiolefin interpolymers including aqueous dispersions thereof and in describing the process and products relating thereto and hereafter certain terms will be employed which will now be generally defined and hereafter set forth in more detail and also limits of the invention will be set out in defining these terms.

*Interpolymer.*—By the term "interpolymer" is meant the polymerization product produced when two or more monomers are polymerized together and includes when two or more different monomer molecules enter into the same polymer molecules, such interpolymers are also referred to as copolymers and further by the term "interpolymer" is meant the polymerization product produced when two or more different monomers are polymerized sequentially or one or more monomers are polymerized in the presence of a polymer; as for example when natural rubber is swollen with methyl methacrylate and the latter polymerized therewith, then the resulting product is an "interpolymer" according to this definition and when the components of an interpolymer are inseparable from one another because the component polymers are chemically bonded to one another then the newly created interpolymer is also referred to as a graft polymer. Thus according to this definition the halogenated polymer modified isoolefin-multiolefin polymers are interpolymers.

*Butyl rubber.*—By the term "butyl rubber" is meant those interpolymers of 90 to 99.5 percent by weight polymerized isobutylene and the remainder polymerized hydrocarbon conjugated diene e.g., isoprene.

*Halogenated.*—By the term "halogenated" is meant the complete or partial halogenation with the aid of a "halogenating agent" (hereafter defined) of the residual unsaturation derived from the multiolefin content of the "polymer modified isoolefin-multiolefin interpolymer" (hereafter defined) and such halogenation includes the introduction of chloro-groups, chloro- with other halogen groups, bromo-groups, bromo- with other halogen groups and combinations of these halogen groups attached directly to the said interpolymer or attached through the residue of the halogenating agent to the said interpolymer.

*Halogenating agents.*—The term "halogenating agents" as used in the practice of this invention includes the halogenating agents as set forth in patent art, as for example, those halogenating agents set forth heretofore in the cited patents regarding the halogenation of isoolefin-multiolefin interpolymers. Such halogenating agents include the halogens and mixed halogen compounds e.g. chlorine, bromine, bromine chloride, iodine chloride, iodine trichloride, iodine bromide, and the chlorine, bromine and iodine compounds of fluorine; hypochlorous acid and alkali metal salts thereof; halogen compounds of sulfur as chlorinating agents such as sulfuryl chloride, thionyl chloride; phosphorous pentachloride, antimony pentachloride, sodium hypochlorite; and like halogenating compounds. The term "halogenating agents" further includes the alkyl (especially tertiary alkyl) esters of hypochlorous acid; the N-chloramines with one or two chlorine atoms attached to the nitrogen, e.g., the chloroanilides, the dichloroanilides, the chloramines, N-chloro-p-nitroacetanilide, N-chlorosuccinimide, N-chloroacetamide; monobromopyrocatechol, dibromosafrole; the N-monohalohydantoins and the N-dihalohydantoins which are represented by the following formula:

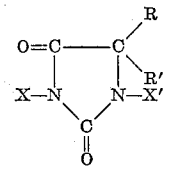

in which R and R′ are hydrogen and/or alkyl, isoalkyl or aryl radicals, especially containing 1 to 12 carbon atoms and X and X′ are hydrogen and/or halogen especially comprising chlorine or bromine. Such compounds include 1,3-dibromo-5,5-dimethyl hydantoin, 1,3-chlorobromo-5,5-dimethyl hydantoin, similar compounds in which one or both of the 5,5-methyl groups are substituted by the following groups including ethyl, propyl, butyl, isobutyl, amyl, isoamyl and the like; and pyridine, picoline, lutidine and collidine compounds having a positive halogen including the chlorine and bromine addition compounds thereof; the halogenated sulfonamides such as sodium p-toluene sulfonechloramide (Chloroamine-T), p-toluene sulfonedichloramide (Dichloramine-T); and like organic halogenating agents.

*Halogenated polymer modified isoolefin-multiolefin interpolymer.*—The term "halogenated polymer modified isoolefin-multiolefin interpolymer" or "halogenated polymer modified interpolymer" as used herein means the "halogenated" product obtained by halogenating a "polymer modified isoolefin-multiolefin interpolymer" with the aid of a "halogenating agent."

By the term "polymer modified isoolefin-multiolefin interpolymer" or "polymer modified interpolymer" as used herein is meant the interpolymer product obtained when "monomer material (hereinafter defined)" in minor proportion by weight is polymerized in the presence of an "isoolefin-multiolefin interpolymer (hereinafter defined)" in major proportion by weight with the aid of a "free-radical generating polymerization catalyst (defined herein)" or catalyst system e.g. redox catalyst system, and such polymer modification of the interpolymer may be conducted with or without organic diluent present or even as an aqueous dispersion. Included among the polymer modified isoolefin-multiolefin interpolymers and the aqueous dispersions of these as herein defined are those set forth in the heretofore cited U.S. co-pending applications and the British patent.

*Isoolefin-multiolefin interpolymer.*—The term "isoolefin-multiolefin interpolymers" employed in this invention includes those solid, plastic, rubbery interpolymers set forth in the heretofore listed butyl rubber patents and particularly those interpolymers set forth in U.S. Patent No. 2,720,479; examples being interpolymers of a major proportion, desirably from 70 to 99.5% by weight, of an isoolefin containing from 4 to 8 carbon atoms such as isobutylene, 3-methyl butene-1, 4-methyl pentene-1, 2-ethyl butene-1, 4-ethyl pentene-1 or the like, or a mixture of such isoolefins, with a minor proportion, desirably from 1 to 30% by weight, of a multiolefin generally containing from 4 to 18 carbon atoms, or two, three or more such multiolefins including the following: (1) acyclic or open-chain conjugated diolefins such as butadiene-1,3, isoprene, 2,4-dimethyl butadiene-1,3, piperylene, 3-methyl pentadiene-1,3, hexadiene-2,4, 2-neopentyl butadiene-1,3, and the like; (2) the minor proportion of such interpolymer being a multiolefin containing from 4 to 18 carbon atoms with or without other monomers and including acyclic non-conjugated diolefins such as dimethallyl and its homologs containing 2 to 6 carbon atoms interposed between two isopropenyl radicals, 2-methyl hexadiene-1,5, 2-methyl pentadiene-1,4, 2-methyl heptadiene-1,6, 2-methyl heptadiene-1,4 and other tertiary non-conjugated diolefins having one double bond in the terminal position attached to a tertiary carbon atom; (3) alicyclic diolefins, both conjugated and non-conjugated, such as cyclo-pentadiene, cyclo-hexadiene, 1-vinyl cyclohexene-3, 1-vinyl cyclohexene-1, 1-vinyl cyclopentene-1, 1-vinyl cyclobutene-2, dicyclopentadiene and the like as well as monocyclic diolefinic terpenes such as dipentene, terpinenes, terpinolene, phellandrines, sylvestrene and the like.

The preferred solid, plastic, rubbery interpolymers are generally prepared by low temperature (from 0° C. to −200° C.) interpolymerization using an appropriate catalyst such as an active metal halide or Friedel-Crafts type catalyst (aluminum chloride or boron trifluoride) dissolved in a low freezing solvent such as methyl or ethyl chloride. These interpolymers generally have an average molecular weight above 15,000, iodine numbers of preferably from 0.5 to 50, and they are reactive with sulfur to form elastic products.

*Monomer material.*—The term "monomer material" employed to form the polymer modified isoolefin-multiolefin interpolymers which are halogenated according to this invention include, monomers having one or more polymerizable unsaturated carbon-to-carbon bond and includes such monomers as: vinyl, vinylidene and allyl aromatic compounds such as styrene, the vinyl toluenes, the methyl styrenes, the ethyl styrenes, the propyl styrenes, the vinyl biphenyls, the vinyl biphenyl ethers, the vinyl naphthalenes, and the like; the substituted vinyl, allyl or vinylidene aromatics including the alkyl, phenyl, alkoxy, phenoxy, acetyl, acylamino, isocyanate, carbamide, amido, amino, nitrile, carboxyamido, trifluoromethyl, phosphoro, and halo (F, Cl, Br) substituents including the mono, di, tri, and tetra substituted styrenes, methyl styrenes, ethyl styrenes, isopropyl styrenes and the like monomers; esters of olefinic acids including α and β substituted olefinic acids and including alkyl, cycloalkyl, alkenyl, aryl, aralkyl, esters such as the methyl, ethyl, propyl, butyl, isobutyl, pentyl, hexyl, cyclohexyl, phenyl esters of acrylic, methacrylic, ethacrylic, and the like; and including the α-haloacrylates such as methyl α-chloroacrylate, propyl α-chloroacrylate and the like; the esters of olefinic alcohols with saturated acids, such as allyl, methallyl, crotyl, 1-chloroallyl, 2-chloroallyl, vinyl, methylvinyl, and the like esters of saturated aliphatic and aromatic monobasic acids as vinyl and allyl acetate, isopropenyl acetate, vinyl formate, vinyl 2-ethyl hexoate, methyl vinyl acetate, vinyl and allyl propionate, vinyl and allyl benzoate, and the like; the vinylalkyl esters of olefinic dicarboxylic acids such as the vinyl alkyl esters from such alkyls as methyl, ethyl, propyl, and the like through $C_5$, of the olefinic dicarboxylic acids including maleic, citraconic, itaconic, muconic, glutaconic, fumaric and derivatives of these esters such as vinyl ethylchloromaleate and the like; olefinic acid esters of epoxy alcohols, such as 2,3-epoxypropyl methacrylate or acrylate, glycidyl methacrylate, glycidyl acrylate, glycidyl crotonate, benzene vinyl monoepoxide and the reaction products of such with amines, as trimethyl amine and the like; the olefinic halides, such as vinyl fluoride, vinyl chloride, vinyl bromide, vinylidene chloride and the like; the alkenyl ketones such as methyl vinyl ketone, isopropenyl methyl ketone and the like; the olefinic ethers such as vinyl ethyl ether, vinyl butyl ether, vinyl cyclohexyl ether, vinyl phenyl ether, vinyl tolyl ether, vinyl benzyl ether and the like; the olefinic aldehydes such as acrolein, methacrolein, and the like; the amino olefinic ethers such as the amino vinyl ethers including aminoethylvinyl ether, aminopropylvinyl ether, N-methylamino-ethylvinyl ether, N,N- diethylaminoethylvinyl ether and the like; nitrogen containing esters of olefinic acids such as aminocyclohexyl methacrylate, triethanolamine monomethacrylate, β-piperidyl-N-ethyl methacrylate, β-morpholine-N-ethyl methacrylate, N-methacrylyl morpholine, N-methacrylyl thiomorpholine, N-methacrylyl piperidines, N-acrylyl morpholine, N- acrylyl thiomorpholine, N-acrylyl piperidine and the like; the quaternary ammonium monomers, including methacryloxyethyltrimethyl-ammonium methylsulfate and various quaternizing reaction products of quaternizing agents such as alkyl halides, alkyl sulfonates, alkyl phosphates and the like (e.g. methyl bromide and toluene sulfonate) with tertiary amine monomers such as β-dimethylaminoethyl methacrylate, methyl α-diethyl aminoacrylate, methyl α-(N-methylanilino)-acrylate, methyl α-dibenzylaminoacrylate, methyl α-distearylamino acrylate and the like; the monoolefinic triazine monomers including triazine monomers in which one of the carbons of the triazine ring is attached to a vinyl, allyl radical or the like and the other carbons of the triazine are attached to cyano, halo (F, Cl, Br), amino, alkoxy, cycloaliphatic (e.g. cyclopentyl, cyclohexyl, etc.), aromatic-substituted (e.g. phenyl, biphenyl, naphthyl, etc), alkylaryl (e.g. tolyl, xylyl, ethylphenyl, etc.), halogenated aromatic and the like; the N-vinyl-N-alkylguanidines such as N-vinyl-N-n-butyl-guanidine, N-vinyl-N-benzyl guanidine, N-vinyl-N-benzyl guanidine, acryloguanamine, methacryloguanamine and the like; the N-vinyl monomers such as N-vinylpyrrole, N-vinyl carbazole, N-vinylindole, N-vinyl succinimide and the like; N-vinyl lactams such as N-vinyl caprolactam, N-vinyl butyrolactam and the like; the amides and substituted amides of acrylic acid and α- and β-substituted acrylic acids such as acrylamide, methacrylamide, ethacrylamide, N-methacrylamide, N- methylmethacrylamide, N,N-bis (hydroxyethyl) acrylamide, N,N-diethylacrylamide, N,N-ethylmethylacrylamide and other mono- and di- N substituted unsaturated acid amides where the substituent is alkyl $C_1$ to $C_5$ alkyl, alkoxy, haloalkyl and the like; the olefinic nitriles such as acrylonitrile, methacrylonitrile, ethacrylonitrile, chloroacrylonitrile and the like; the fluoro-substituted nitriles of olefinic acids such as N-(2,2,3-trifluoroethyl) acrylamide, methacrylamide, N-(2,3-difluoroethyl) acrylamide and methacrylamide; the acylamino substituted acrylic and α- and β-acrylic acid esters such as the methyl, ethyl, propyl and the like alkyl esters of α-acetoaminoacrylate, α-N-butyraminoacrylate and the like; the vinyl pyridines such as 2-vinyl pyridine, 3-vinylpyridine, 4-vinylpyridine, 2-vinyl-5-ethyl pyridine, 2-methyl-5-vinylpyridine and the other ethyl and methyl isomers of vinylpyridine and the like; the vinyl heterocyclic compounds such as 2-vinylfuran and 2-vinylthiophene and the like; the silicon-containing monomers such as silicon tetra-acrylate, silicon tetramethacrylate, vinyltrichlorosilane and its hydrolysis products, the vinyl and allyl silicates and the like; the phosphorus containing monomers such as acrylic esters containing phosphonamido groups such as diamidophosphoroacrylate and the like and other similar polymerizable materials having a polymerizable unsaturated carbon-to-carbon bond.

The conjugated dienes include the following: hydrocarbon conjugated dienes such as butadiene-1,3, isoprene, 2,3-dimethylbutadiene-1,4, piperylene, pentadiene-1,3, 2 phenyl butadiene-1,3, and the like; the polar conjugated dienes such as 1- and 2-cyano-butadiene-1,3, 2-chlorobutadiene-1,3 and the like.

Monomer material having a plurality of polymerizable unsaturated carbon-to-carbon bonds at least two of which are non-conjugated, and include: the polyunsaturated esters of olefinic alcohols and unsaturated monocarboxylic acids such as the vinyl, vinylidene, and allyl esters of unsaturated monocarboxylic acids such as vinyl acrylate, allyl acrylate, the vinyl and allyl esters of α- and β-substituted acrylates such as vinyl methacrylate, vinyl crotonate, vinyl ethacrylate, allyl methacrylate, allyl ethacrylate, vinyl α-chloroacrylate, allyl α-hydroxy-ethyl acrylate, and the like; the polyunsaturated esters of saturated dicarboxylic and polycarboxylic acids such as the vinyl, vinylidene, allyl esters and mixed esters of such dicarboxylic acids as oxalic, malonic, succinic, glutaric, adipic, tartaric, citric, and the like; polyunsaturated esters of unsaturated polycarboxylic acids, such as the vinyl, vinylidene, and allyl esters and mixed esters of the unsaturated polycarboxylic acids such as maleic, citraconic, itaconic, mesaconic, fumaric, muconic, chloromaleic, aconitric and the like including such monomers as diallyl fumarate, diallyl homophthalate, diallyl itaconate, diallyl ester of muconic acid, diallyl maleate, diallyl phthalate, diallyl isophthalate, diallyl terephthalate, and the like; polyhydroxy esters of unsaturated acids such as the glycol esters, glycol ethers esters, the trihydroxy-, tetrahydroxy-, pentahydroxy-, hexahydroxy-esters including the glycerides, the pentoses, the hexoses, esters of acrylic acid and α- and β-substituted acrylic acid such as ethylene diacrylate, ethylene dimethacrylate, propylene dimethacrylate, glycerol dimethacrylate, glyceryl trimethacrylate, tetramethylene diacrylate and dimethacrylate, tetraethylene glycol dimethacrylate and the like; polyunsaturated acid amides such as N, N-diallyl acrylamide, N, N-diallyl methacrylamide, N,N-methylene bisacrylamide and the like; polyunsaturated ethers such as divinyl ether, diallyl ether, divinyl carbitol, divinyl ether of diethylene glycol and the like; polyunsaturated triazines, the diallyl cyanurates, triallyl cyanurate, the di- and tri-vinyl cyanurates and derivatives of these and the like; the poly alkene aryl compounds and derivatives including the polyvinyl-, polyvinylidene- and polyallyl-aryl compounds, such as divinyl benzene, trivinyl benzene, divinyl toluene, trivinyl toluene, divinyl xylene, divinyl ethyl benzene, divinyl biphenyl and divinyl biphenyl oxide, divinylnaphthalenes, divinyl methylnaphthalenes, and derivatives of these including those with alkyl, alkoxy, phenoxy, acetyl, isocyanate, amino, nitrile, trifluoro methyl, and halo (F, Cl, Br) groups and the like; and other monomers containing a plurality of vinyl, vinylidene, allyl, alkenyl and other polymerizable unsaturated double and triple bonds. The members of this generic class of monomers having one or more polymerizable unsaturated groups may be more briefly designated as monomer material containing at least one carbon-to-carbon multiple bond and polymerizable therethrough with the aid of a free radical generating polymerization catalyst. (Form approved in Hedrick et al. Patent No. 2,625,529—666 O.G. 560.)

*Free-radical generating polymerization catalysts.*—The term "free-radical generating catalysts and catalyst systems" designates the catalysts employed to polymerize monomer material to form the polymer modified interpolymer which is halogenated according to this invention and in the presence of the isoolefin-multiolefin interpolymer includes: the inorganic peroxides such as hydrogen peroxide and the like; the various organic peroxy catalysts, such as the dialkyl peroxides, e.g. diethyl peroxide, diisopropyl peroxide, dilauryl peroxide, dioleyl peroxide, distearyl peroxide, di-(tertiary-butyl) peroxide; di-(tertiary amyl) peroxide, dicumyl peroxide and the like; the alkyl hydrogen peroxides such as tertiary butyl hydroperoxide, tertiary amyl hydroperoxide, cumene hydroperoxide, tetralin hydroperoxide, and diisopropyl benzene hydroperoxide; the symmetrical diacyl peroxides, for instance acetyl peroxide, propionyl peroxide, lauroyl peroxide, stearoyl peroxide, malonyl peroxide, succinoyl peroxide, phthaloyl peroxide, benzoyl peroxide; ketone peroxide such as methylethyl ketone peroxide, cyclohexanone peroxide, and the like; the fatty oil acid peroxides, such as cocoanut oil acid peroxides and the like; the unsymmetrical or mixed diacyl peroxides, such as acetyl benzoyl peroxide, propionyl benzoyl peroxide and the like; the azo compounds such as 2-azobis (isobutyronitrile), 2 azobis (2-methylbutyronitrile), 1 azobis (1-cyclohexancarbonitrile) and the like and other free radical generating catalysts employable in emulsion polymerization.

The higher temperature generating free radical organic catalysts can be employed at elevated temperatures with the sluggish monomers such as the allyl monomers.

The monomer material and the free-radical generating catalyst may be worked into the isoolefin-multiolefin interpolymer in an open mixer or on a rubber mill or other type of suitable mixer provided the monomers are not too volatile or this combination may be intermixed in a closed mixer especially where the monomers are volatile and the monomer material polymerized. The isoolefin-multiolefin interpolymer, if not already in solution, may be dissolved or dispersed in a solvent (defined hereinafter) and then combined with the monomer material and the free-radical generating polymerization catalyst and then the monomer material polymerized and such is preferably carried out in a suitable closed vessel or apparatus.

*Emulsifiers.*—By the term "emulsifier" or "dispersant" is meant those anionic, cationic and non-ionic emulsifiers suitable for emulsifying water with non-aqueous solutions of partially halogenated polymer modified isoolefin-multiolefin interpolymers. Typical emulsifiers are given in the examples. It is important to keep the emulsifier concentration low and the examples have been so designed. About 10 percent by weight of emulsifier based on interpolymer content in practically all instances suffices and in most instances 5 to 6 or less percent by weight of emulsifier based on the polymer content is sufficient. One of the principal novelties of this invention resides in the discovery that the halogenated polymer modified isoolefin-multiolefin interpolymers can be emulsified from solution with low amounts of emulsifier and the solvent volatilized off with little or no precoagulum forming thus yielding a stable aqueous dispersion which in most instances can be concentrated to a high solids aqueous dispersion or latex.

The anionic emulsifiers employed in the examples include the alkali soaps e.g. the potassium soap of rosin acids and of disproportionated rosin acids and the alkali soap e.g. the potassium soap, of cocoanut fatty acids. While the soaps of fatty acids in general are useful and especially so when the soaps are prepared from hydrogenated or saturated fats (as such soaps do not rob the sulfur during curing); likewise other emulsifiers such as ammonium caseinate in solutions are useful; and further, hydrocarbon sulfonate emulsifiers and other organic sulfonate emulsifiers including the alcohol sulfonates and such as the alkali metal salts or ammonia or amine salts can also be employed e.g. the sodium salt of butyl-naphthalene sulfonic acid, or the sodium salt of naphthalene sulfonic acid (Nacconol NRSF, a trademark product); likewise, other types of organic sulfonate emulsifiers can be employed such as the dioctyl ester of sodium sulfosuccinic acid (Aerosol OT, a trademark product), and the sodium salt of alkyl aryl polyether sulfate (Triton 770, a trademark product) and the like.

The cationic emulsifier employed in the examples was dodecylamine salts such as the dodecylamine-glycolate, acrylate, methacrylate, etc. and likewise other primary, secondary, tertiary, and quaternary amine type emulsifiers may be employed e.g., the alkyl polyoxyethylene amines (Katapol PN-430, a trademark product) and the like.

The halogenated polymer modified isoolefin-multiolefin interpolymer solutions are somewhat difficult to emulsify with non-ionic emulsifiers and for such an emulsifier to be effective the HLB (hydrophile-lipophile balance) must be high and the chemical type must be correct for the particular halogenated polymer modified isoolefin-multiolefin interpolymer. Emulsifiers for the purposes of this invention with high HLB value can be selected from among the alkyl polyoxyethylene ethers and alcohols, polyethylene ethers and alcohols, e.g., polyoxyethylene lauryl ethers, polyethylene lauryl alcohol e.g., Brij-35 (a trademark product); the polyethylated fatty alcohols e.g., Emulphor ON or ON-870 (a trademark product) and in some instances the alkyl aryl poly ether alcohols and like non-ionic emulsifiers including combinations of such including with other types of non-ionic emulsifiers. Examples of the non-ionic emulsifiers of the types set forth are to be found in the "Fourth Revision of Synthetic Detergents and Emulsifiers," by John W. McCutcheon, published in Soap and Chemical Specialties, December 1957, January, February, March, April 1958.

It should be noted that the water solubility and surface activity of non-ionic surface active agents are dependent on the hydrophilic nature of the ether linkage and/or the hydroxyl groups in the non-ionic surface-active agent, rather than on ionization as in the case of the ionic (anionic and cationic) surface-active agents. The hydrogen bonding between the water and the ether linkage of such non-ionic surface-active agents decreases with temperature rise therefore emulsions of such with the halogenated polymer modified interpolymers of this invention should be stripped of diluent at low temperatures to prevent separation of the interpolymer from the aqueous dispersion. Thus aqueous dispersions prepared with non-ionic emulsifiers according to this invention can be employed where heat sensitive latex coatings are desired.

Further combinations of anionic and/or non-ionic emulsifier can be employed as well as combinations of cationic and/or non-ionic emulsifiers.

One skilled in the art after having been taught by the examples set forth herein, will realize that certain anionic, cationic and non-ionic emulsifiers suitable for the emulsification of heavy hydrocarbon oils or hydrocarbon polymers can likewise be employed to emulsify the solutions of the halogenated polymer modified isoolefin-multiolefin interpolymers of this invention (for examples of emulsifiers see John W. McCutcheon's Fourth Revision of Synthetic Detergents and Emulsifiers, set forth in December 1957, January, February, March and April 1958 issue of Soap and Chemical Specialties).

*Diluent.*—By the term "diluent" or "solvent" is meant diluents and solvents suitable for dissolving or colloidally dispersing the halogenated polymer modified isoolefin-multiolefin interpolymers. The solvents include methyl chloride, ethyl chloride, methylene chloride, chlorobenzene, chloroform, carbon tetrachloride, carbon disulfide, benzene, toluene, the xylenes, cyclohexane, methyl cyclohexane and in some instances non-aromatic hydrocarbon solvents e.g., hexane, heptane and the like, and combinations of these solvents.

To increase the effectiveness of the emulsifier, especially when such emulsifiers are of the anionic or cationic types suitable water soluble organic solvents can be employed in limited amounts including those water soluble solvents having one or more of the following groups: hydroxyl, ether, carbonyl (including aldehyde and ketone) or combinations of these groups as for example, methyl, ethyl, or isopropyl alcohols, ethylene or propylene glycols, glycerin, hydroxyethyl ether, dioxane, methyl ethyl ketone, acetone, methyl Cellosolve, butyl Cellosolve, methyl carbitol and the like. These water soluble solvents are usually employed in amounts of more or less from 5–20% by weight based on the amount of solvent used to dissolve said isoolefin-multiolefin interpolymer in preparing the polymer modified isoolefin-multiolefin interpolymers and the halogenated products thereof. It is understood that the amount of water soluble solvent added must be less than the amount which will cause precipitation of said interpolymer from the solution of said interpolymer in the selected water immiscible solvent or from the aqueous dispersion.

Thus is to be understood that the term "solvent" as employed herein and in the appended claims is meant to include not only the water immiscible solvents for the interpolymers of this invention, but also the combination of these water immiscible solvents with minor proportions of the water miscible (water soluble) solvents.

The amount of solvent preferably employed is usually about 7 to 10 times the weight of isoolefin-multiolefin interpolymers or the polymer modified, or the halogenated polymer modified derivative thereof; however, an emulsifiable viscosity being the limiting factor. While certain polar solvents including certain halogenated solvents and even certain petroleum solvents including aromatic solvents can be used, it has ben the practice in the examples in most instances to employ benzene because of the ease of removal of benzene by volatilization.

*Aqueous medium.*—The term "aqueous medium" means of course in water. It has been found that when the water employed is in amounts about equal to half the weight or less of the weight of solvent employed or an amount which will yield aqueous dispersions with an interpolymer content of about 10 to 30% by weight, then stable aqueous dispersions result; that is, the solvent (e.g., benzene) is removable without the formation of appreciable precoagulum. Further in many instances such aqueous dispersions can be further concentrated to high solids latices 40 to 60 percent by weight or more of interpolymer solids.

While in the examples reduced pressures are used to remove the volatile solvent it has been found that steam can be passed into the emulsions with or without vacuum to remove the aqueously non-miscible solvent.

*Concentration of Aqueous Dispersions of Halogenated Polymer Modified Issolefin-Multiolefin Interpolymers*

The aqueous dispersions of halogenated polymer modified interpolymers can be concentrated in three principal manners: (*a*) latex concentration by water vapor removal and (*b*) latex concentration by creaming with aid of a creaming agent and separating the creamed layer, (*c*)

creaming with the aid of electrolytes and reduction of temperature close to the freezing point, and either of processes (b) or (c) can sometimes be aided by centrifuging.

Aqueous dispersions of the halogenated polymer modified interpolmers are readily prepared to 20–25 percent polymer solids and by continuing the vacuum-heat stripping operation after the solvent has been removed one can remove a part of the water and increase the solids to 25–35 percent polymer solids and by this vacuum method one can obtain high solid latices of 50–60 percent polymer solids.

Creaming agents can be used to cream the aqueous dispersions of this invention, however, because of the small particle size (most of the aqueous dispersions of this invention are filterable through shark skin type filter paper) often centrifuging is employed in combination to the addition of creaming agent to accomplish the creaming.

The creaming agents employable herein include the sodium, potassium, or ammonium alginates, tragon seed gum, locust beam gum, konjaku flour, carraghee moss, agar-agar, pectin, gum tragacanth, karaya gum. Synthetic polyelectrolyte type polymers if the molecular weight is high enough such as sodium, potassium or ammonium polyacrylates, methacrylates, copolymers of maleic anhydride and vinyls such as styrene, vinyl toluene etc., may in some instances be employed, however, the non-polyelectrolyte high molecular weight water soluble polymers are preferred. Especially suitable are the poly-vinyl alcohols and ethers, polyethylene oxides, methyl cellulose, ethyl cellulose, methoxycellulose, hydroxyethyl cellulose and like compounds. The amount of hydrophilic polymer creaming agent employed is from about 0.1 to 1.0 percent preferably about 0.3 percent by weight based on the water content of the dispersion being creamed. Most of the vegetable gums and non-ionic creaming agents are best prepared for use by allowing such to swell for several hours in sufficient cold water to make a 2 to 3% solution and then heating to 60° C. while stirring until a clear solution is obtained. An alkali in small amounts e.g., ammonia may be added to make the solution alkaline if such is to be employed with interpolymer aqueous dispersion prepared with an anionic emulsifier or even a small amount of acid added if such are employed with halogenated polymer modified interpolymer aqueous dispersions prepared with cationic emulsifiers.

Dispersion of halogenated polymer modified isoolefin-multiolefin interpolymer prepared with cationic emulsifiers may be creamed with the natural occurring or synthetic non-ionic creaming agents as set out heretofore and in some instances may be creamed with a polyelectrolyte derived at least in part from basic polymerizable monomer material e.g., monomers having primary, secondary, or tertiary amine groups, as for example the vinyl pyridine polymers which can be dissolved in aqueous solution with the aid of an acid such as glycolic acid.

Creaming is usually aided by raising the temperature as aforesaid and/or adjustment of the latex pH e.g., with hydroxyethyl cellulose; however, methyl cellulose gives better results when the latex is cold. The creamed products may separate satisfactorily after standing 12 to 48 hours otherwise centrifuging is employed and any suitable centrifuge such as the De Laval and Sharples machines may be employed.

*Compounding of Halogenated Polymer Modified Isoolefin-Multiolefin Interpolymers*

It is understood that the halogenated polymer modified isoolefin-multiolefin interpolymers including aqueous dispersions thereof according to this invention may be combined with other elastomers and plastomers including polymer modified interpolymers set forth in copending U.S. application No. 626,762, filed December 6, 1956, and/or natural rubber latices and/or natural rubber latices modified by vinyl grafting to the natural rubber thereof and/or latices of derivatives of natural rubber and/or synthetic rubbers including conjugated diene-vinyl type synthetic rubbers e.g. butadiene-styrene copolymers, butadiene-acrylonitrile copolymers, etc.; and/or resin latices derived from monomer material having at least a polymerizable carbon to carbon bond, e.g., the vinyl resin latices such as those prepared from styrene, the vinyl toluenes, the acrylate monomers, vinyl chloride, vinylidene chloride, the fluorine containing monomers, acrylonitrile, etc.; and/or phenoplast aqueous dispersions or aqueous solutions and/or aminoplast aqueous dispersions or aqueous solutions and/or aqueous dispersions of α-olefin polymers or copolymers, e.g., polyethylene dispersions, etc., and combinations of these.

The latices produced according to this invention are particularly but not exclusively useful as latex dips for the coating of natural or synthetic fibres, such as silk, rayon, "nylon" and other sheer knitted hosiery. They may also be advantageously employed for treating a variety of textile and other fabric materials. Thus fabrics and other fibrous structures of wool, cotton, silk, glass and synthetic yarns or threads such as "nylon," rayon polyester fibre (e.g., "Dacron"), polyacrylonitrile (e.g. "Orlon") and others, may be treated by dipping or the treating dispersions may be simply spread, brushed, or transferred to the fibrous material by a transfer roll.

The latices produced by the present invention may also be employed for the making of latex-cast articles, latex-foam articles, and for blending with other polymeric material or materials for producing polymer combinations of modified properties.

The latices of this invention, and combinations of those with other latices, before or after concentration, may be latex compounded for the production of vulcanizates therefrom, and the compounding ingredients employed may include colored pigments and the like when derived for decorative purposes.

The halogenated polymer modified isoolefin-multiolefin interpolymers with and without elastomers and/or plastomers and including these in the form of aqueous dispersions can be compounded to produce vulcanizable compositions in the following manner with the aid of (1) sulfur curing systems e.g. those including highly active accelerators and suitable for curing butyl type eltastomers including the telluram accelerators; (2) the aminoplasts including halogenated aminoplasts and phenoplasts including halogenated phenoplasts and combinations of these; (3) halogenated polymers consisting of halogenated polymers from conjugated dienes, halogenated polymers from conjugated dienes and vinyl monomers and halogenated natural rubbers and combinations of these; (4) radiation curing employing the radiation from radio-active materials or other radiation sources capable of cross-linking polymers (such curing usually does not require the presence of vulcanization aiding materials), and combinations of these methods.

The preparation of aqueous dispersions of various compounding ingredients is accomplished in conventional manners (see Royce J. Noble's treatise entitled "Latex in Industry," published in 1953 by Rubber Age, 250 West 57th St., New York city, N.Y., for methods of preparing latex compounding ingredients in aqueous dispersion).

Particularly suitable for compounding the interpolymer hereof including the aqueous dispersions thereof are the aminoplasts including the halogenated aminoplasts or phenoplasts including halogenated phenoplasts and the halogenated unsaturated polymers.

The term "aminoplast" or "aminoplastic" is used in the same manner that C. P. Vale uses this term in his book entitled "Aminoplastics," published in 1950 by Cleaner-Hume Press, Ltd., London, England. To form aminoplasts one can, for example, condense urea, melamine, thiourea or guanidine with an aldehyde such as formaldehyde or glyoxal and as catalyst either acid or alkaline condensation agents may be used. Thus 1 mole of urea may be condensed with two moles of formaldehyde with the aid of a small amount of acidic or alkaline condensing agents (U.S. Patent No. 1,355,834) forming the dimethylolurea and if this condensation is conducted in an alcohol solution etherification of the primary alcohol groups are promoted, e.g., with butyl alcohol to produce the dimethylol dibutyl ether.

By the term "halo-aminoplasts" or "halogenated aminoplasts" is meant the amide-aldehyde condensates modified by etherification with a halo-alcohol. Thus these halogenated aminoplasts include the urea, thiourea, toluene, sulphonamide, ethylideneurea, melamine, guanidine and the like amides condensed (with or without the aid of a catalyst e.g., an acid or alkaline catalyst) with an aldehyde such as formaldehyde, paraformaldehyde, glyoxal, furfural, acrolein, methacrolein, benzaldehyde, aldol and the like aldehyde and partially or completely etherified with a mono- or poly-halogenated, mono- or poly-hydric $C_2$ to $C_{22}$ alcohol including the partially or completely chlorinated, brominated, chloro-brominated or hydroxy chlorinated or hydroxy-brominated unsaturated alcohols such as lauroleyl myristoleyl, palmitoleyl, oleyl, gadoleyl, erucyl, linoleyl linolenyl, eleostearyl ricinoleyl, arachidonyl, cupanodonyl, undecanleyl alcohols, and including such halogenated products of other unsaturated $C_2$ to $C_{22}$ alcohols e.g. chloro ethanol (chlorohydrin), bromoethanol (bromohydrin), the chloropropanols, the bromopropanols, the chlorobutanols, the bromobutanol, and $C_5$ to $C_{22}$ homologues of these and the $C_2$ to $C_{22}$ hydroxy-chloro-ethers and the $C_2$ to $C_{22}$ hydroxy-bromo-ethers. These halogenated aminoplasts provide reactive halogens curable with metal oxides amines etc. as set forth herein and are thus employable with the interpolymers of this invention and such combinations are new, unique and useful.

When latex compounding the aminoplasts and halo-aminoplasts such may be emulsified (with or without aqueous miscible or aqueous non-miscible solvent present) with the aid of an emulsifier such as employed for the interpolymers hereof.

The term "phenoplast" or "phenoplastic" is used in the same manner as used by T. S. Carswell in his book entitled "Phenoplasts, Their Structure, Properties and Chemical Technology," published in 1947 by Interscience Publishers, Inc., New York, N.Y. To form a phenoplast a substituted phenol such as cresol, a xylenol or resorcinol is reacted with an aldehyde such as formaldehyde, paraformaldehyde, glyoxal, furfural and the like aldehydes with or without the aid of an acid or basic catalyst. Particularly suitable for use with the interpolymers and aqueous dispersion of interpolymers of this invention are the phenoplasts known as "resols" which are phenol-aldehyde condensation products derived from phenol, hydrocarbon substituted phenols, bis-phenols, bis-phenol hydrocarbons, bis-(hydrocarbon substituted phenol) or bis-(hydrocarbon substituted phenol) hydrocarbons condensed with two molecules of aldehyde to form the corresponding dialcohols e.g., phenol dialcohol, bis-phenol-dialcohols etc. Thus phenol, p-cresol, p-ethyl-phenol, p-tert.-butyl phenol, p-tert.-amyl phenol, p-tert.-octyl phenol, p-tert.-nonyl phenol, p-phenyl phenol, p,p'-dihydroxy-diphenylmethane (bisphenol F), 4,4'-dihydroxy biphenyl, 4,4'-dihydroxy diphenyl dimethyl methane (bisphenol A), dihydroxy diphenyl sulfone and other long chain bisphenols and the like including in certain instances the ortho hydrocarbon substituted dihydroxy phenyls or the dihydroxy biphenyls which are formed by condensing such with two moles of aldehyde e.g., formaldehyde and these dimethylol derivatives are referred to herein as "resols." These dialcohols of these phenols or resols are usually formed by reacting two moles of reactive aldehyde and one mole of these phenols with the aid of an acid or even a strong alkaline catalyst in the temperature range of about 25 to 100° C.

The term "resol" as used in this invention and as set out heretofor and hereafter is used in the same sense as used in the treatise by H. W. Chatfield entitled "Varnish Constituents," published in 1953 by Leonard Hill Ltd., London, England. The author states on pages 295 and 296: "Oil-soluble (phenol-formaldehyde type) resins can be made either with acidic or basic catalysts.

"Acid catalysed resins are sometimes described as novolaks or resites; alkali catalysed resins are known as resols. The novolaks have no free reactive methylol groups and remain permanently fusible on further heating. Further condensation can, however, be effected by the addition of hardening agents.

"The resols contain free reactive methylol groups, and can be made to condense further, or harden by the simple application of heat, without the necessity of introducing hardening agents. The novolaks usually involve a slight molar excess of phenol, and the resols a slight molar excess of aldehyde.

"Generally speaking the resols usually possess better alcohol solubility and the novolaks better hydrocarbon solubility.

"Substituents in the benzene ring with hydrocarbon constituents in the ortho and para position is preferable to substituents in the meta position for oil solubility."

These resols, that is the biphenylalcohols or dialcohol phenols include for example the 4-hydrocarbon-2, 6-dimethylol phenol, bis 2-(4-hydrocarbon-6-methylol phenol) methane, bis 4-(2 hydrocarbon-6-methylol phenol)methane, and the like in which the hydrocarbon radical is an alkyl, isoalkyl, phenyl, alkyl phenyl, cycloalkyl alkyl cycloalkyl having a carbon range of 1 to 20 carbon atoms and preferably 3 to 20 carbon atoms. These dialcohols especially these dimethylols of phenol, hydrocarbon substituted phenols, biphenols and hydrocarbon substituted biphenols etc. are oil-soluble, heat reactive and self-condensing or self-curing. In combination with the aqueous dispersions of the interpolymers of this invention these dialcohols are employed while still aqueous alkali soluble or such may be heat treated and employed while still A-stage resins (resoles) referred to herein as "resols" or even the condensation may proceed until such are no longer aqueous alkali soluble even to the B-stage resins (resitol) referred to herein as "resols" provided such are dispersible in water with the aid of a water soluble organic solvent such as an alcohol e.g. ethanol or a ketone e.g., acetone or an ether, e.g. dioxane and/or the aid of an emulsifying agent.

The solvents employable in this invention to disperse the interpolymer hereof can include in addition to the water immiscible solvents set forth herein also in minor amount water miscible solvents having hydroxy, ether, aldehyde and ketone groups or combinations of these groups and these water soluble solvents can be employed to dissolve the "resols" and thus provide an easy manner of incorporating such resols with the interpolymers of this invention before or after such are dispersed in water with the aid of an emulsifying agent or before or after the water immiscible solvent is removed.

It is well known in the varnish trade that resols and resol esters react with unsaturated drying oils to make oil extended phenolic resins especially with the aid of basic catalyst such as basic oxides e.g. magnesium oxide, zinc oxide and the like, or with the aid of organic amines of with the aid of organic acids or mineral acids or with the aid of acidic metal halides e.g. Friedel-Crafts catalysts such as tin dichloride, zinc chloride, ferric chloride and the like.

In employing the resols and resol esters in combination with the isoolefin-multiolefin interpolymers of this invention basic catalyst can be employed when anionic and/or non-ionic emulsifiers are used to prepare the aqueous interpolymer dispersion hereof; and acidic catalyst can be employed when cationic and/or non-ionic emulsifiers are used to prepare the aqueous interpolymer dispersions.

Aldehydes in the presence of alkali will react with ketones. Thus aldol condensation products of formaldehyde and acetone or other ketones like ethyl methyl ketone may be employed, for example, with resorcinol to form the resol employable with the interpolymer of this invention.

The resols heretofore described may be esterified by reacting with acetic anhydride or other acid anhydrides in known manner and the resol esters employed in place of the resols herein or combinations of resols and resol esters may be employed. The resol esters are used in the same amounts as the resols are employed with the interpolymers hereof.

The "resols" are employed in amounts of from 0.2 to 25% or preferably from 0.5 to 20% based on the weight of the halogenated polymer modified isoolefin-multiolefin interpolymers hereof.

By the term "halogenated phenolic resins or phenoplast" or "halo-phenoplast" is meant the phenoplast including the resols prepared from alkyl substituted phenol in which one or more hydrogens of the $C_1$ to $C_{14}$ alkyl group thereof is substituted by a halogen group particularly a chlorine and/or bromine group. Further discussion and examples of these halogenated phenolic resins is set out hereafter.

By the term "halogenated polymer" is meant the halogenated polymers from conjugated dienes, halogenated polymers from conjugated dienes and vinyl monomers and halogenated natural rubbers and these halogenated polymers may be prepared from conjugated halo-dienes such as 2-chloro-butadiene-1,3, 2-bromobutadiene-1,3 and the like e.g., the chloroprenes and further included under this term is meant the partially or completely halogenated unsaturated polymers including chloroprene, natural rubber, polybutadiene, conjugated diene-vinyl copolymers including butadiene-styrene, butadiene-vinyl toluene, butadiene-acrylonitrile, butadiene-acrylate copolymers and similar copolymers in which all or part of the butadiene is substituted by isoprene, piperylene and the like.

PROCEDURES

This invention is concerned with the halogenation of polymer modified isoolefin-multiolefin interpolymers and such halogenation can be conducted when such interpolymers are in solid form or in dispersion in a diluent, or in aqueous dispersion. Furthermore, the invention is concerned with the aqueous dispersion of such halogenated polymer modified interpolymers dispersed in a diluent.

In more detail (1) the polymer modified isoolefin-multiolefin interpolymers in bulk can be placed in a mill or in a Banbury mixer, or in other types of closed or open mixer employed in the rubber trade and 0.5% to 5% of an organic compound capable of releasing chlorine and/or bromine worked in and the temperature of the mixture raised until halogenation thereof takes place. The halohydantoin compounds are employed in this manner to halogenate for instance the polar vinyl polymer modified butyl type elastomers.

Another procedure (2) is to prepare the polymer modified isoolefin-multiolefin interpolymer in small pieces or thin sheets which are placed in a closed container in contact with chlorine and/or bromine gas until the residual unsaturation of said interpolymer has been halogenated (usually requiring about 1 to 2 mole percent halogen for a polar vinyl modified butyl type rubber).

Another procedure (3) is to disperse or prepare in a diluent the polymer modified isoolefin-multiolefin interpolymer and add chlorine and/or bromine or other halogenating agent also in a diluent thereto and mix well permitting halogenation to take place by elevating the temperature if necessary.

The halogenated polymer modified isoolefin-multiolefin as a solid prepared by procedure (1) or (2) can be dispersed in a diluent according to procedure (4).

Further the such diluent dispersed halogenated polymer modified isoolefin-multiolefin interpolymer prepared according to procedure (3) or (4) can according to procedure (5) be combined with water and with the aid of a suitable anionic or cationic or non-ionic emulsifying agent emulsified and with the aid of heat or vacuum or both the diluent can be removed yielding an aqueous dispersion of the halogenated polymer modified isoolefin-multiolefin interpolymer.

In another procedure (6) the polymer modified isoolefin-multiolefin in aqueous dispersion can be halogenated with a halogenating agent. Preferably the aqueous dispersion of the interpolymer employed is prepared with a cationic or non-ionic emulsifier.

Another procedure (7) is to start with the isoolefin-multiolefin interpolymer and in the solid state preferably in a closed masticator monomer is added and the free-radical generating catalyst and the temperature raised if necessary permitting the monomer material to polymerize thus forming the polymer modified isoolefin-multiolefin interpolymer and then the halogenating agent added and the halogenation permitted to take place yielding the halogenated polymer modified isoolefin-multiolefin interpolymers.

Procedure (8) is similar to procedure (7) only both the polymer modification and subsequent halogenation of the isoolefin-multiolefin interpolymer is carried out in a diluent.

In procedure (9) the isoolefin-multiolefin interpolymer in the form of an aqueous dispersion is first polymer modified by adding monomer material and free-radical generating catalyst and permitting the monomer material to polymerize followed by addition of the halogenating agent to said aqueous dispersion and permitting the halogenation to take place.

The product of the polymer modification and halogenation of said isoolefin-multiolefin interpolymer carried out in solid phase (7) may be dispersed in a diluent, or these reactions carried out in a diluent as in (8) and these diluent dispersions of halogenated polymer modified isoolefin-multiolefin interpolymers can according to procedure (10) be combined with water and emulsified with the aid of a suitable anionic, cationic, or non-ionic emulsifier and the solvent removed with the aid of vacuum or heat to yield an aqueous dispersion of the halogenated polymer modified isoolefin-multiolefin interpolymer.

In procedure (11) the isoolefin-multiolefin interpolymer can be polymer modified either in the solid state or dispersed in a diluent and then converted to an aqueous dispersion by adding water and an emulsifying agent and removing the solvent and then the product halogenated in the aqueous phase to yield an aqueous dispersion of the halogenated polymer modified isoolefin-multiolefin interpolymer.

According to procedure (12) the isoolefin-multiolefin interpolymer can be formed at low temperatures, in a diluent with the aid of a Friedel-Crafts catalyst and by procedure (12*i*) before or after removal of the solvent the interpolymer can first be polymer modified with the aid of monomer material and a free-radical catalyst and the product recovered or before or after recovery converted to an aqueous dispersion by adding water and emulsifying with the aid of an emulsifying agent and removing the solvent from the aqueous dispersion of halogenated polymer modified isoolefin-multiolefin interpolymer, or according to (12*ii*) the polymer modification can be conducted before conversion of the polymer modified isoolefin-multiolefin to the aqueous dispersion; or according to (12*iii*) both the polymer modification and subsequent halogenation of the isoolefin-multiolefin can be conducted after the isoolefin-multiolefin interpolymer has been converted to the aqueous dispersion. These three variations of method 12 are important as such are adaptable for applying the present invention to convert processes for the commercial production of butyl rubber.

The (12) processes set forth above have unique subgeneric differences but at the same time constitute a genus as all said processes include the final step of halogenation and all said processes yield halogenated polymer modified isoolefin-multiolefin interpolymers (either as solid interpolymers or as dispersions of such interpolymers in diluent or aqueous media) within the broad scope of this invention.

The invention further contemplates (13) that the aqueous dispersions of the halogenated polymer modified isoolefin-multiolefin interpolymers of this invention may be concentrated from latices of a solids content of 10–30% by weight more or less, to high solid latices of 45 to 55% by weight more or less especially with the aid of a hydrophilic polymeric creaming agent.

The examples set forth hereinafter describe these processes and the new products derived therefrom and the compounding of these products to yield vulcanizates with new and useful properties:

EXAMPLES

The examples hereof exemplify the methods of halogenating polymer modified isoolefin-multiolefin interpolymer and such halogenation is carried out by three methods:

(a) Halogenation of the polymer modified interpolymer dispersed in a diluent, (b) Halogenation of an aqueous dispersion of polymer modified interploymer and (c) Halogenation of the polymer modified interpolymer in solid phase and this latter method can be conducted in two ways: (c–1) the polymer modified interpolymer preferably in the form of fine corns or thin sheets is placed in an atmosphere containing a halogen gas or vapor e.g. chlorine, bromine, iodine chloride, iodine monobromine or combinations of these, or (c–2) the polymer modified interpolymer is milled with a solid halogenating agent e.g. dibromo-dimethyl hydantoin, dichloro-dimethyl hydantoin, bromo-chloro-dimethyl hydantoin, N-chloro-succinimide, N-bromo-succinimide and the like and the temperature being raised to permit the halogenation of the polymer modified interpolymer by the halogenating agent.

*Example 1A—Polymer Modification of Interpolymers*

In a glass bottle was placed 100 grams of butyl rubber (type GR-I-15) cut into about ¼ inch cubes and 1000 grams of benzene. After mildly agitating overnight the butyl rubber had dissolved in the benzene. The solution was clarified by standing 12 hrs. and decanting the clear butyl rubber solution from the sedimented material. The butyl rubber solution containing 96 grams of polymer solids was put back in a bottle and 6 grams of 4-vinyl-pyridine and 14 grams of butadiene-1,3 followed by 2 grams of benzoyl peroxide (the free-radical generating catalyst) and the bottle was capped and rotated in a water bath at 60° C. overnight. By determining the polymer solids it was found that 92% of the added monomers had polymerized. This example of polymer modifying an isoolefin-multiolefin interpolymer and examples prepared in an analogous manner are set forth in Tables I-A hereafter.

*Example 1B—Halogenation of Polymer Modified Interpolymers*

With the aid of some vacuum and a warm water bath the diluent benzene was removed yielding 114 grams of the butadiene-4-vinylpyridine polymer modified isobutylene-isoprene interpolymer. This interpolymer was placed on a rubber mill and 1 gram of dibromo-dimethyl hydantoin milled in. The polymer was then placed in an oven at 50° C. for 4 hours. This example of halogenating a polymer modified isoolefin-multiolefin interpolymer and examples prepared in an analogous manner are set forth in Table I-B hereafter.

*Example 1C—Aqueous Dispersion of Halogenated Polymer Modified Interpolymer*

The 115 grams of the bromo-modified interpolymer was removed from the oven and cut into small pieces and placed in 1 liter of benzene in a bottle which was capped and placed in a 60° C. water bath and rotated overnight. The benzene solution of the halogenated polymer modified interpolymer was placed in a high speed mixer (Waring Blendor) and 550 ml. of water containing 10 grams of dodecylamine glycolate added and the combination emulsified. The emulsion was placed in a 5 liter balloon flask warmed in a water bath at 50° C. and with the aid of vacuum the benzene was removed. In order to remove the last few percent of benzene the temperature of the water bath was increased to 80° C. and 10% of water from the emulsion together with the residual benzene was removed with the aid of vacuum. This example of converting into an aqueous dispersion a halogenated polymer modified isoolefin-multiolefin interpolymer and the examples prepared in an analogous manner are set forth in Table I-C hereafter.

*Examples 2 to 10*

The procedure in preparing these examples is analogous to Example 1 and for details see Tables I-A, I-B and I-C.

In Examples I-B-1 thru I-B-5 the polymer modified butyl type rubbers are prepared free of diluent and solid halogenating agents are milled in. In Examples I-B-1 and 2 this combination is dispersed in a diluent benzene and heated to effect the halogenation. In Examples I-B-3 to 5 the combinations are oven heated to effect the halogenation, alternately the combination may be worked in a Banbury at elevated temperatures to effect halogenation. In Examples I-B-6 thru 10 the polymer modified butyl type rubber is halogenated in solution. As an alternate procedure to examples I-B-6 thru 10 the polymer modified butyl type rubber in thin sheets or small pieces can be treated directly with halogen gases or vapors to produce the halogenated polymer modified butyl rubber.

The halogenated polymer modified isoolefin-multiolefin interpolymers whether in the solid state or dispersed in a diluent are new and useful polymer products.

Table I-C teaches the aqueous dispersion of the halogenated polymer modified butyl type rubber. Examples I-C-1, 2, 3, and 9 exemplify the use of a cationic emulsifying agent to prepare aqueous dispersions of the halogenated polymer modified butyl type rubber hereof. Examples I-C-3, 5 and 6 exemplify the use of a non-ionic emulsifier with or without the aid of small amounts of cationic or anionic emulsifier to prepare aqueous dispersions of the halogenated polymer modified butyl type rubber hereof. Examples I-C-4, 6, 7, 8 and 10 exemplify the use of an anionic emulsifier to prepare aqueous dispersions of halogenated polymer modified butyl type rubber hereof. The aqueous dispersions set forth in Examples I-C-1 thru 10 are new and useful products.

In preparing the aqueous dispersions set forth in the examples of Table I-C, it has been found when amounts of water used are less than the amounts of diluent and when the dispersions are stripped with little or no agitation then stable aqueous dispersions result. Small amounts of water soluble diluents can be included and often more stable aqueous dispersions result without precoagulum.

Tables I-A, I-B and I-C exemplify the quantities of materials and the conditions. It should be noted that the products of the examples in Table I-A are used in the examples of Table I-B and the products thereof used in the examples of Table I-C.

TABLE I-A

[Polymer modification of isoolefin-multiolefin interpolymer]

| Example No. I-A- | 1 | 2 | 3 | 4 | 5 | 6 | 7 | 8 | 9 | 10 |
|---|---|---|---|---|---|---|---|---|---|---|
| Isoolefin-multiolefin interpolymers (grams): Isobutylene-isoprene (GR-I-15) [1] | 100 | 100 | 100 | 100 | 100 | 100 | 100 | 100 | 100 | 100 |
| Diluent or solvent (ml.): | | | | | | | | | | |
| Benzene | 1,000 | | 1,000 | 1,000 | 1,000 | 1,000 | 1,000 | 1,000 | 1,000 | 1,000 |
| Cyclohexane | | 1,000 | | | | | | | | |
| Polymer solution filtered before grafting (x) | | | | | | | | | x | x |
| Monomers for polymer modification (grams): | | | | | | | | | | |
| Acrylonitrile | | 20 | 8 | 5 | | | | | | 4 |
| Butadiene | 14 | | | | | | | | | |
| Ethylmethacrylate | | | | | | | 10 | 15 | | |
| Methylmethacrylate | | | | | 10 | 15 | | | | |
| 4-vinypyridine | 6 | | | | | | | | 10 | 2 |
| Polymerization catalyst (grams): | | | | | | | | | | |
| Benzoyl peroxide | 2 | 2 | 2 | 2 | 4 | 4 | 4 | 4 | 2 | |
| Cumene hydroperoxide | | | | | | | | | | 1.5 |
| Cyclohexanone peroxide | | | 2 | | | | | | | |
| Diisopropylbenzene hydroperoxide | | | | 2 | | | | | | |
| Triethylenetetramine | | | | | | | | | | 1.5 |
| Polymerization conditions: | | | | | | | | | | |
| Time (hrs.) | 16 | 32 | 32 | 32 | 39 | 39 | 39 | 39 | 18 | 18 |
| Temperature (° C.) | 60 | 60 | 60 | 60 | 60 | 60 | 60 | 60 | 60 | 25 |
| Conversion (percent weight) | 92 | 100 | 95 | 95 | 100 | 100 | 100 | 100 | 100 | 100 |

[1] GR-I-15 is a copolymer of polymerized isobutylene 97.5% and polymerized isoprene 2.5% with PBNA as antioxidant and with a Mooney viscosity of 46.

TABLE I-B

[Halogenation of polymer modified isoolefin-multiolefin interpolymers]

| Examples No. I-B- | 1 | 2 | 3 | 4 | 5 | 6 | 7 | 8 | 9 | 10 |
|---|---|---|---|---|---|---|---|---|---|---|
| Solvent removed from polymer modified interpolymer | x | x | x | x | x | | | | | |
| Halogenating agent hot milled into interpolymers | x | x | x | x | x | | | | | |
| Halogenating agent (grams): | | | | | | | | | | |
| Dibromo-dimethyl hydantoin [1] | 1 | | | | | | | | | |
| Dichloro-dimethyl hydantoin [1] | | 2.5 | | | | | | | | |
| Bromo-chloro-dimethyl hydantoin [1] | | | 1.5 | | | | | | | |
| N-chlorosuccinimide | | | | 1 | | | | | | |
| N-bromosuccinimide | 0 | | | | 0.8 | | | | | |
| 10% bromine in benzene | | | | | | 5 | 2 | | | |
| 10% chlorine in benzene | | | | | | | 6 | 2 | | |
| 10% iodine chloride in methylene chloride | | | | | | | | | 4 | |
| 10% iodine monobromide in benzene | | | | | | | | | | 5 |
| Halogenation conditions: | | | | | | | | | | |
| Halogenation temp. ° C | 50 | 50 | 80 | 80 | 80 | 5 | 5 | 5 | 5 | 5 |
| Halogenation time, hrs | 4 | 4 | 2 | 2 | 2 | 0.5 | 0.5 | 0.5 | 0.5 | 0.5 |

[1] Supplied by a commercial source.

TABLE I-C

[Aqueous dispersion of halogenated polymer modified isoolefin-multiolefin interpolymer]

| Example No. I-C- | 1 | 2 | 3 | 4 | 5 | 6 | 7 | 8 | 9 | 10 |
|---|---|---|---|---|---|---|---|---|---|---|
| Dispersed in 1 liter of benzene | x | x | x | x | x | | | | | |
| Water, ml | 550 | 550 | 550 | 550 | 550 | 550 | 550 | 550 | 550 | 550 |
| Cationic emulsifier (grams): | | | | | | | | | | |
| Dodecylamine salt of glycolic acid | 10 | | 2 | | | | | | 10 | |
| Dodecylamine hydrochloride | | 8 | | | | | | | | |
| Non-ionic emulsifier (grams): Polyoxyethylene lauryl alcohol (10% sol) [1] | | | | 5 | | 10 | 5 | | | |
| Anionic emulsifier (grams): | | | | | | | | | | |
| Sodium salt of alkyl naphthalene sulfonic acid [2] | | | | | | | | 2 | | |
| Sodium salt of dodecylbenzene sulfonic acid [3] | | | | | | | | 0.5 | 5 | |
| Sodium salt of sulfosuccinic acid [4] | | | | | | | | | | 6 |
| Potassium salt of cocoanut oil fatty acids | | | | | 5 | | 5 | | | |
| Aqueous dispersion: | | | | | | | | | | |
| Emulsified with high speed blendor [5] | x | x | x | x | x | x | x | x | x | x |
| Solvent vacuum striped at 60° C.[6] | x | x | x | x | x | x | x | x | x | x |

[1] Brij 35 a trade mark non-ionic emulsifier.
[2] Daxad II, a trade mark product.
[3] Nacconol NR, a trade mark product.
[4] Aerosol OT, a trade mark product.
[5] Waring type blendor.
[6] Without mechanical agitation.

*Examples 11 to 21*

Examples 11 to 18 exemplify aqueous halogenation of an aqueous dispersion of polymer modified butyl type rubbers. In these examples the aqueous dispersion of interpolymer was prepared with a cationic emulsifier in order that the subsequent halogenation steps employing the halide gases or vapors will not coagulate the aqueous dispersion. The procedure of these examples is similar to Example 1 except that the halogenation is accomplished in the aqueous phase. The halogenation process and the products as set forth in Examples 11 to 18 are new and useful.

In Examples 19 to 21 the butyl type rubbers are polymer modified in the solid state and then treated with a halogenating gas or vapor to form the new solid halogenated polymer modified isoolefin-multiolefin interpolymers hereof.

Tables II-A and II-B exemplify the quantities of materials and the conditions. It should be noted that the product of the examples in Table II-A are used in the examples of Table II-B to produce the halogenated polymer modified interpolymers hereof including aqueous dispersions thereof.

TABLE II-A
[Polymer modification of isoolefin-multiolefin interpolymer]

| Example No. II-A- | 11 | 12 | 13 | 14 | 15 | 16 | 17 | 18 | 19 | 20 | 21 |
|---|---|---|---|---|---|---|---|---|---|---|---|
| Isoolefin-multiolefin interpolymer (grams): | | | | | | | | | | | |
| Isobutylene-isoprene (GR-I-17)[1] | 100 | 100 | 100 | 100 | 100 | 100 | 100 | 100 | 100 | 100 | 100 |
| Dispersed in 1 liter benzene | x | x | x | x | x | x | x | x | | | |
| Dodecylamine glycolate, g | 10 | 10 | 10 | 10 | 10 | 10 | 10 | 10 | | | |
| Water, g | 550 | 550 | 550 | 550 | 550 | 550 | 550 | 550 | 550 | 550 | 550 |
| Emulsified high speed blendor | x | x | x | x | x | x | x | x | | | |
| Solvent vacuum stripped at 60° C | x | x | x | x | x | x | x | x | | | |
| Monomers for polymer modification (grams): | | | | | | | | | | | |
| Acrylonitrile | | | | | | | | | | [2]10 | |
| Allylacrylate | | | | | | | 2 | | | | |
| Ethyleneglycoldimethacrylate | | | | | | 2 | | | | | |
| 2-Hydroxypropylmethacrylate | | | | 4 | | | | | | | |
| Isoprene | | | | | | | | 5 | | | |
| Methylmethacrylate | 10 | | | | | | | | | | |
| Styrene | | 5 | 6 | 8 | 6 | 8 | 8 | 5 | [2]10 | | |
| 4-vinypyridine | | 5 | 4 | 2 | | | | | | | [2]10 |
| Polymerization catalyst (grams): | | | | | | | | | | | |
| Cumene hydroperoxide[3] | 2 | 2 | 2 | 2 | 2 | 2 | 2 | 2 | | | |
| Benzoyl peroxide | | | | | | | | | 1.5 | 1.5 | 1.5 |
| Polymerization conditions: | | | | | | | | | | | |
| Catalyst mixed into interpolymer[4] | | | | | | | | | x | x | x |
| Polymerization temp., ° C | 70 | 70 | 70 | 70 | 70 | 70 | 70 | 70 | 100 | 100 | 100 |
| Polymerization time, hrs | 14 | 14 | 14 | 14 | 14 | 14 | 14 | 14 | 4 | 4 | 4 |

[1] GR-I-17 is a copolymer of polymerized isobutylene 97.5% and polymerized isoprene 2.5% with PBNA as antioxidant and with a Mooney viscosity of 68.
[2] Monomer mixed in on chilled rubber mill.
[3] After addition of cumene hydroperoxide bottle capped and rotated in water bath.
[4] Interpolymer containing monomer and catalyst placed in a closed confining container and heated.

TABLE II-B
[Halogenation of Polymer Modified Isoolefin-Multiolefin Interpolymer]

| Example No. II-B- | 11 | 12 | 13 | 14 | 15 | 16 | 17 | 18 | 19 | 20 | 21 |
|---|---|---|---|---|---|---|---|---|---|---|---|
| Milled to thin sheet and placed in bottle | | | | | | | | | x | x | x |
| Halogenating agent[1] (grams): | | | | | | | | | | | |
| 10% chlorine in benzene | 10 | 10 | 8 | 5 | | | 3 | | 8 | | 3 |
| 10% bromine in methylene chloride | | | | | 8 | 6 | 3 | | | 8 | 3 |
| 10% iodine chloride in methylene chloride | | | | | | | | 5 | | | |
| Halogenation conditions: | | | | | | | | | | | |
| Halogenation temp., ° C | 5 | 5 | 5 | 5 | 5 | 5 | 5 | 5 | 5 | 5 | 5 |
| Halogenation time, hrs | 0.5 | 0.5 | 0.5 | 0.5 | 0.5 | 0.5 | 0.5 | 0.5 | 0.5 | 0.5 | 0.5 |

[1] Halogenating agent added to bottle then bottle capped and rotated.

Example 22

This example illustrates how butyl rubber produced by the conventional industrial process of polymerization thereof may be converted to an aqueous dispersion then polymer modified and halogenated.

A mixture consisting of 1280 grams methyl chloride or ethyl chloride as diluent, 560 grams of isobutylene and 8.5 grams of isoprene is cooled to −150° F. and 4 grams of sublimed aluminum chloride dissolved in 400 grams of methyl chloride is cooled to −150° F. and charged to the precooled reactant mixture at −150° F. in a precooled reactor at −150° F. and agitated with a propeller agitator and the polymer is formed almost instantaneously. Upon completion of the polymerization 2,500 grams of methyl chloride as solvent for the butyl rubber is added and the temperature of the interpolymer and diluent is raised to 200° F. in a pressure retaining vessel to dissolve the interpolymer. To this solution of diluent and butyl rubber is added 1800 ml. of water.

Further 50 grams of ethanol an aqueous miscible solvent was added to the aqueous phase hereof for the purpose of reducing the emulsifier requirements and to aid in yielding a stable latex and further adding 5.5 grams of dodecylamine, 34 grams of dodecylamine hydrochloride and the mixture emulsified.

The diluent is then flashed off with the aid of heat and vacuum leaving an aqueous emulsion of the butyl elastomer.

To the aqueous dispersion of butyl rubber is added and mixed therein 28 grams of monomeric acrylonitrile containing 5 grams of benzoyl peroxide dissolved therein and the temperature raised to 50 to 80° C. for sufficient time (4 hrs. at 60° C.) to permit the polymer modification of the butyl rubber to take place.

The resulting aqueous dispersion of acrylonitrile polymer modified butyl rubber is cooled to 5° C. and halogenated by intimately mixing therewith 50 grams of a 10% by weight of chlorene in methylene chloride and the halogenation of the polymer modified isoolefin-multiolefin interpolymer is complete after 15 minutes or less. With the aid of heat and vacuum the methylene chloride is removed yielding the interpolymer latex.

Alternate Procedures to Example 22

In Example 22 in place of the 8.5 grams of isoprene to 560 grams of isobutylene one can employ 1 to 2 mole percent or higher isoprene based on the isobutylene.

Further in Example 22 the amount of diluent was 1280 grams of methyl chloride. Alternatively other diluents can be employed e.g., ethyl chloride and the ratio of diluent to reactive hydrocarbons (isobutylene plus isoprene) can vary over a wide range; however, 20–35% reactive hydrocarbon and 65–80% diluent is usually employed.

In Example 22 the mixture of reactive hydrocarbons and diluent was cooled to −150° F. Alternatively, one may employ temperatures below −100° F. especially about −120 to −150° F.

In Example 22 4 grams of aluminum chloride dissolved in 400 grams of methylchloride was employed. Alternatively other Friedel-Crafts catalysts useful in polymerizing isoolefins may also be employed in the range of 0.05 to 1.0% by weight based on reactive hydrocarbons. Alternatively the polymerization of butyl rubber may be conducted continuously instead of batch-wise.

In Example 22 to the butyl rubber diluent combination was added 2,500 grams of methyl chloride. Alternatively, one may use other ratios of polymer to solvent in the range of from 1 to 3 to 1–12 and the ratio selected being dependent on the molecular weight of the interpolymer and such ratio is so selected that the viscosity of the interpolymer solution is not excessive which would make aqueous emulsification thereof difficult.

In Example 22 the temperature of the interpolymer and diluent is raised to 200° F. Alternatively one may heat to any temperature within the range of 120-250° F. at which the butyl rubber will dissolve in the diluent or diluents. Alternatively the catalyst can be removed and the butyl rubber can then be dissolved in the solvent.

In Example 22 to the butyl rubber solution was added 1800 ml. of water. Alternatively, the amount of water employed can be varied to yield aqueous dispersions of interpolymer content of 10 to 30% by weight with the limiting factor controlling the amount of water added being the viscosity of the emulsion when inversion takes place which viscosity in part depends on the molecular weight of the isoolefin-multiolefin interpolymer being emulsified, and the practical range for an aqueous dispersion of halogenated butyl rubber being between about 20 to 28% total solids.

In Example 22 50 grams of ethanol was added with the water. Alternatively about 5–20% by weight aqueous miscible solvent may be employed such as propylene glycol, glycerine, acetone, dioxane or the like and such aqueous miscible solvent is added for the purpose of reducing the emulsifier requirements and to aid in yielding a stable latex and when a non-easily-volatile aqueous miscible solvent e.g. glycerine is used such can improve the stability of the resulting latex in respect to low temperatures storage or freezing during transportation.

In Example 22 to neutralize the aluminum chloride 5.5 grams of dodecylamine was added. Alternatively, the aluminum chloride can be neutralized with a molar equivalent or more of caustic soda, caustic potash, ammonia or a water soluble amine. If desired the aqueous dispersion of butyl rubber may be filtered or lightly centrifuged to remove catalyst residues or traces of precoagulum.

In Example 22 to emulsify the butyl rubber solution or dispersion and water 34 grams of dodecylamine hydrochloride were used. Alternatively, one can use 3 to 12% by weight based on the amount of interpolymer of cationic emulsifier or a combination of cationic and non-ionic emulsifier or even a non-ionic emulsifier alone as illustrated in the examples hereafter.

In Example 22 to the butyl rubber latex was added 28 grams of acrylonitrile and 5 grams of benzoyl peroxide; alternatively, other vinyl, vinylidene, allyl, diene or combinations of these monomers may be employed for the polymer modification and other free-radical generating catalysts can be employed as taught in the examples hereof. While in this example the 5 grams of benzoyl peroxide employed was excessive to insure the complete polymerization of the acrylonitrile, it is understood lesser amounts of catalyst can be employed.

In Example 22 the polymer modified butyl rubber latex was halogenated with 50 grams of 10% solution of chlorine in methylene chloride. Alternatively, one may use about 5 to 10 or less grams of halogen e.g. bromine chloride per se or dissolved in the diluent or combination of diluents; or other halogenating agents may be employed in molar amounts equivalent or less than the molar unsaturation of the polymer modified isoolefin-multiolefin interpolymer present and thus are produced new and useful aqueous dispersions of halogenated polymer modified isoolefin-multiolefin interpolymers.

In this Example 22 the polymer modification and halogenation has been carried out with the butyl rubber in aqueous dispersion; however, the polymer modification and halogenation can be carried out with the butyl rubber in solvent dispersion and thereafter the resulting product aqueously dispersed; or the butyl rubber can be polymer modified in solvent dispersion then aqueously dispersed and halogenated in the aqueously dispersed phase.

The procedure herein exemplified including modifications thereof as taught by the other examples of this invention and the equivalents within the scope of this invention provides a practical process by which the commercial production of butyl rubber may be modified to produce butyl latices polymer modified butyl latices and the halogenated products thereof.

*Concentration of Aqueous Dispersions*

The aqueous dispersions of the halogenated polymer modified interpolymers hereof, e.g., as prepared in the previous examples and in the examples hereafter, may be concentrated to high solid latices by three steps as follows: (1) the solvent is vacuum stripped from the aqueous dispersion of the halogenated interpolymer and the resulting latex is further concentrated by vacuum water stripping while heating the latex to about 60–95° C., that is, until the latex dry solids has reached 25–35% (this partial removal of water assures that the last traces of solvent are also removed) and then if desired water is further removed until the desired solids are obtained; step (2), a creaming agent solution is prepared dissolving in water about 2–5% preferably about 3% of water soluble polymer to yield a highly viscous solution (the best creaming agents are those hydrophilic polymers giving the highest viscosity aqueous solution with the least polymer). The creaming agent solution is combined with the aqueous dispersion of halogenated polymer modified interpolymer (20 to 30% by weight solids) hereof employing about 0.2 to 2.0% and preferably about 0.3% creaming agent based on the water phase of the aqueous dispersion being creamed. Improvement in concentration is sometimes accomplished by adjusting the pH to the alkaline about 8–12, preferably about 10 for the interpolymer aqueous dispersions prepared by anionic emulsifier, and acidifying to a pH of about 2–6, preferably about 3, for the interpolymers prepared with cationic emulsifiers usually improves the creaming action. The creaming agent solution and the aqueous dispersion of halogenated polymer modified interpolymer hereof are then intimately mixed (the pH is adjusted if desirable) and the mixtures aged about 8 to 48 hrs., preferably about 12 hrs. This aging process permits the creaming agent (the hydrophilic polymer) to diffuse into the aqueous medium of the halogenated polymer modified interpolymer aqueous dispersion thereby concentrating such. In some cases aging alone, with aid of some heat if necessary, will cause creaming; however, it may be necessary to resort to the aid of centrifuging step (3) hereof. When the proper creaming agent is chosen the creamed product will be a latex of about 40–60% dry solids or more.

*Example 23*

An aqueous dispersion of a chlorinated acrylonitrile polymer modified isobutylene-isoprene interpolymer prepared with a cationic emulsifier dodecylamine hydrochloride as prepared in Example 2, Tables I–A, I–B and I–C, in the amount of 100 ml. is mixed with a highly viscous solution of 0.2 gram of polyacrylamide dissolved in 7 ml. of water and allowed to stand 12 hours and then centrifuged in a laboratory centrifuge. The polymer layer is separated from the supernatant liquor. The concentrated interpolymer latex has a polymer solids of about 45% by weight. This example and examples prepared in an analogous manner using other creaming agents and other latices prepared according to Tables I-A, I-B and I-C are set forth in Table III hereafter.

*Examples 24 to 27*

These examples are prepared similarly to Example 23 and the proportion of ingredients and conditions are set forth in Table III hereafter.

TABLE III

[Preparation of high solids latices by creaming aqueous dispersion of halogenated polymer modified interpolymer]

| Example | 23 | 24 | 25 | 26 | 27 |
|---|---|---|---|---|---|
| Creaming agent: | | | | | |
| Hydrophilic Polymer: | | | | | |
| Polyacrylamide,[1] g | 0.2 | | | | |
| Polyethylene oxide,[2] g | | 0.2 | | | |
| Tragacanth gum, g | | | 0.2 | | |
| Methoxycellulos,[3] e | | | | 0.2 | |
| Polyethyleneoxide,[4] g | | | | | 0.2 |
| Water, ml | 7 | 7 | 7 | 7 | 10 |
| Time for solution, hrs | 12 | 12 | 12 | 12 | 12 |
| Halogenated polymer latex: | | | | | |
| Latex type from Example I-C | 2 | 4 | 6 | 8 | 10 |
| Amount (latex), ml | 100 | 100 | 100 | 100 | 100 |
| Intimately mixed | x | x | x | x | x |
| Aged, hrs | 12 | 12 | 12 | 12 | 12 |
| Centrifuged | x | x | x | | |
| Creamed latex: Dry solids, percent weight | 40-65 | 40-65 | 40-65 | 40-65 | 40-65 |

[1] Polyacrylamide 200, a trade marked product.
[2] Carbopol 934, a trade marked product.
[3] Cellosize WP-4400, a trade marked product.
[4] Polyox WSR-301, a trade marked product.

*Example 28*

To 180 grams of benzene was added 20 grams of butyl rubber (GR-I-17) cut into small pieces and permitted to dissolve and the solution was pressure filtered (10% solids). Then 10 grams of hydroxypropylmethacrylate and 2 grams of cumene hydroperoxide was added and after heating 4 hours at 80° C. the polymer modified butyl rubber formed. In a high speed mixer was added the polymer modified butyl rubber in benzene and 2 grams of dodecylamine followed by 1 gram of glycolic acid (70% purity) and 100 grams of water. The high speed blendor while rapidly mixing also heated the mixture to 69° C. and part of the benzene evaporated the remainder was removed by subsequent heating to 100° C. Chlorine gas diluted with air was allowed to pass into 100 grams of the above prepared butyl latex cooled to 50° C. until 0.2 gram of chlorine had been taken up. The resulting product was an aqueous dispersion of aqueously chlorinated hydroxypropylmethacrylate polymer modified butyl rubber.

*Example 29A—Polymer Modified Butyl Latex*

To each of 8 bottles was added 75 grams of butyl rubber (Polysar Butyl XPRD-759 containing non-staining antioxidant, a trademarked product) and 700 ml. of benzene and the bottles were capped and rotated in a water bath at 60° C. overnight. Then 7.5 grams of methylmethacrylate and 2 grams of benzoyl peroxide was added thereto and polymerized at 80° C. overnight to yield the methylmethacrylate polymer modified butyl rubber. The resulting product in benzene was placed in a high speed blendor (Waring Blendor) and to it was added 7.5 grams of dodecylamine (Armeen 12D a trademark product) and 3.75 grams of glycolic acid (70% purity) followed by 375 ml. of water and the mixture was emulsified by agitating at high speed for 10 minutes. The emulsion was placed in a flask heated in a water bath at 70° C. and with the aid of vacuum the solvent benzene was stripped off yielding a stable aqueous dispersion of the polymer modified butyl rubber.

The methylmethacrylate polymer modified butyl rubber latex of this Example 29A may be creamed in the manner set forth in Examples 23 to 27 heretofor. The methylmethacrylate polymer modified butyl elastomer aqueous dispersion (butyl latex) from this Example 29A is halogenated in various manners according to the following Examples 29B to 29I hereafter.

*Example 29B—Chlorination of Polymer Modified Butyl Latex With Chlorine*

To a bottle was added 149.2 grams of polymer modified butyl rubber latex prepared according to Example 29A above and 0.4 g. of chlorine was combined therewith by adding 4 grams of a 10% solution of chlorine in methylene chloride after which the bottle was capped and vigorously shaken. The polymer modified butyl rubber latex was chlorinated and the resulting chlorinated polymer modified butyl latex was then vacuum stripped to remove the methylene chloride yielding a stable latex.

*Example 29C—Chlorination of Polymer Modified Butyl Latex With an Organic Chlorinating Agent*

To a bottle was added 149.2 grams of polymer modified butyl rubber latex prepared according to Example 29A above and 1 gram of N-chlorosuccinimide dissolved in 10 ml. of water and the bottle was capped and rotated for 6 hrs. in a water bath at 60° C. during which time the polymer modified butyl rubber latex was halogenated and a stable aqueous dispersion of halogenated polymer modified butyl rubber was obtained.

*Example 29D—Bromination of Polymer Modified Butyl Latex With Bromine*

To a bottle containing 149.2 grams of polymer modified butyl rubber latex prepared according to Example 29A above was added 0.3 gram of bromine and the bottle capped and shaken for 4 hours or until the free bromine disappeared. The resulting product was a stable brominated polymer modified butyl latex.

*Example 29E—Bromination of Polymer Modified Butyl Latex With an Organic Brominating Agent*

To a bottle containing 149.2 grams of polymer modified butyl rubber latex prepared according to Example 29A above was added 0.9 gram of N-bromosuccinimide dissolved in 9 grams of water and the bottle was capped and rotated in a water bath at 60° C. for 4 hours at which time the halogenation reaction was complete. The resulting product was a brominated polymer modified butyl latex.

*Example 29F—Bromo-Chlorination of Polymer Modified Butyl Latex*

To a bottle was added 149.2 grams of polymer modified butyl latex prepared according to Example 29A above and 0.4 gram of bromine chloride dissloved in 4 grams of methylene chloride (or alternatively chlorine and bromine can be added sequentially in molar ratios or in other desired ratios and in amounts preferably less than or equal to the unsaturation present in the butyl rubber of the monomer treated butyl latex selected). The bromo-chlorine treated latex was then shaken (about 4 hours at 50° C.) until the halogenation reaction was completed and the methylene chloride was vacuum stripped off. The resulting product was a partially bromo-chlorinated polymer modified butyl latex.

*Example 29G—Iodo-Chlorination of Polymer Modified Butyl Latex*

To a bottle was added 149.2 grams of polymer modified butyl latex prepared according to Example 29A above, and 0.3 gram of iodine chloride in 3 grams of methylene chloride. (Alternatively one may use a mixture of iodine and chlorine, in the desired ratios depending on the unsaturation available in the butyl rubber of the latex employed). The bottle was capped and shaken until the halogenation reaction was complete and the methylene chloride was vacuum stripped off. The resulting product was iodo-chlorinated polymer modified butyl latex.

*Example 29H—Iodo-Bromination of Polymer Modified Butyl Latex*

To a bottle was added 149.2 grams of polymer modified butyl latex prepared according to Example 29A above and 0.25 gram of iodine combined with 0.16 gram of bromine in 5 ml. of benzene. Other ratios of these halides may be used depending on the unsaturation available in the polymer modified butyl rubber of the latex employed. The bottle was capped and shaken until the halogenation reaction was complete and the benzene was vacuum stripped off. The resulting product was an iodo-brominated polymer modified butyl latex.

*Example 29I—Bromo-Chlorination of Polymer Modified Butyl Latex*

To a bottle was added 149.2 grams of polymer modified butyl latex prepared according to Example 29A, 0.2 gram of N-chlorosuccinimide dissolved in 2 ml. of water and 0.2 gram of N-bromosuccinimide dissolved in 2 ml. of water and the bottle was capped and rotated in a water bath at 60° C. for 6 hours, i.e. until the halogenation reaction was complete. Other ratios of the chlorinating and brominating agent may be employed depending on the amount of unsaturation present in the polymer modified butyl rubber of the latex employed. The resulting product was a bromo-chlorinated polymer modified butyl latex.

Thus any suitable chlorination, bromination, chloro-bromination, iodo-chlorination, iodo-bromination agent from those set forth under halogenation agents heretofore which are employable in aqueous solution may be employed. It is, of course, realized by one skilled in the art that the latex employed must be prepared with an emulsifying agent to form latices which are stable in the presence of the aqueous halogenating agent, e.g., polymer modified butyl latex from Example 29A. If the polymer modified butyl type elastomer latex is not sufficiently stable to permit halogenation then additional emulsifier of the same or different type may be added before or during the halogenation. If it is desired to concentrate these halogenated polymer modified butyl latices to solids in the range of 40 to 60% by weight this can be done in a manner as set forth in Examples 23 to 27 heretofore. In some instances addition of further emulsifier before or during the concentration of the halogenated polymer modified butyl latex is necessary, although, such additional emulsifier was not necessary with the examples given.

In Examples 29B to 29I, in place of the methyl methacrylate polymer modified butyl rubber prepared according to 29A can be employed. The polymer modified butyl type rubbers set forth in U.S. application No. 626,782, filed December 6, 1956, by the estate of René G. Jennen, entitled "Graft Olefin Polymers and Copolymers and Uses Thereof," can be used. Thus in Examples 29B to 29I can be substituted the polymer modified butyl rubbers set forth in Table IV hereafter. In the examples in Table IV in which the monomer used in polymer modifying the butyl rubber is an acidic monomer then an anionic emulsifier is employed instead of the cationic emulsifier used in Example 29A and the halogenation is preferably carried out while the polymer modified butyl rubber is dispersed in diluent rather than in aqueous phase.

TABLE IV

| Monomers employed to form polymer modified butyl type rubbers: | Pts. monomer per 100 pts. butyl rubber [1] |
|---|---|
| Acrylonitrile | 3.2 |
| Do | 1.6 |
| Do | 10 |
| Do | 11 |
| Do | 6.4 |
| Do | 5 |
| Ethylmethacrylate | 1.6 |
| Do | 20 |
| Do | 30 |
| Methylmethacrylate | 20 |
| Do | 30 |
| Butadiene/methacrylic acid (80/20) | 20 |
| Do | 100 |
| Methacrylic acid/4-vinylpyridine (50/50) | 20 |
| Styrene/divinylbenzene/2 - vinylpyridine (80/10/10) | 20 |
| Styrene/4-vinylpyridine (50/50) | 10 |
| Do | 2 |
| Methacrylamide/acrylic acid (80/20) | 20 |
| Methacrylamide/methacrylic acid (80/20) | 20 |
| Maleic anhydride/methacrylamide (80/20) | 20 |
| Butylacrylamide/acrylic acid (80/20) | 20 |
| Methacrylic acid | 20 |
| Styrene/divinylbenzene (90/10) | 20 |
| Styrene/divinylbenzene/methacrylic acid (80/10/10) | 20 |
| Butadiene/4-vinylpyridine (70/30) | 10 |
| Styrene/diallyl maleate (60/40) | 10 |
| Styrene/hydroxypropylmethacrylate (60/40) | 10 |
| Styrene/ethyleneglycoldimethacrylate (80/20) | 10 |
| Styrene/allylacrylate (80/20) | 10 |
| Styrene/isoprene (50/50) | 10 |
| Diallylaryl phosphate [2] | 10 |

[1] The butyl rubber employed was either GR-I-15 or GR-I-17.
[2] Phosphoresin monomer, a trademarked product.

*Example 30—Aqueous Halogenation of an Aqueous Dispersion of Polymer Modified Isoolefin-Multiolefin Interpolymer Prepared With Both Anionic and Non-Ionic Dispersing Agent*

To 1110 grams of a benzene solution containing 100 grams of butyl rubber (Polysar XPRD-759 containing non-staining antioxidant, a trade marked product) was added 5 grams of acrylonitrile and 2 grams of benzoyl peroxide and after heating 4 hours at 80° C. the polymer modified butyl rubber had formed and this was placed in a high speed mixer of the Waring type with 30 grams of a 12.5% aqueous solution of the potassium soap of coconut oil fatty acids, 450 ml. of water and 20 ml. of ethanol and this combination was emulsified. The emulsion was placed in a flask heated in water bath at 60° C. and benzene removed by vacuum stripping.

To 614.5 grams of the above acrylonitrile polymer modified isobutylene-isoprene interpolymer aqueous dispersion was added 50 grams of a 10% solution of a non-ionic emulsified polyoxethylene lauryl alcohol (Brij 35, a trademark product) and after mixing in the high speed mixer the pH of the aqueous dispersion was adjusted to 6 with 10% acetic acid and cooled to 5° C. in an ice bath.

A solution of 3.75 grams of bromine dissolved in 33.75 grams of benzene was added to the bottle containing the cooled butyl latex. After shaking 5 minutes and being capped and placed in a water bath at 60° C. and rotated for 1 hour, the benzene added with the bromine was removed from the resulting latex by vacuum stripping. A stable dispersion of aqueously brominated polymer modified butyl rubber resulted. In place of the bromine one can employ chlorine, bromine chloride or alternately bromine and chlorine, or other halogenating agents as set forth under halogenating agents herein. While an aqueous miscible solvent was employed in preparing the aqueous dispersion of the polymer modified butyl rubber hereof when the intended use of the product permits the use of more emulsifier then the use of an aqueous miscible solvent is not essential.

*Example 31—Aqueous Halogenation of an Aqueous Dispersion of Polymer Modified Isoolefin-Multiolefin Interpolymer Prepared With Non-Ionic Emulsifier*

To 155 grams of a 12.9% butyl rubber (Polysar XPRD-759) in benzene was added 5 grams of methacrylonitrile and 2 grams of cumene hydroperoxide and after heating 4 hours at 80° C. the polymer modified butyl rubber had formed and this was placed in a high speed mixer (Waring type) with 2 grams of non-ionic emulsifier polyoxyethylene lauryl alcohol (Brij 35, a trademark product) and 75 ml. of water, and the combination was agitated for 10 minutes to form the emulsion. The emulsion was placed in a flask and stripped of benzene with the aid of vacuum.

To a bottle containing 50 grams of this polymer modified butyl rubber latex cooled to +5° C. was added 1 gram of a 10% solution of chlorine in methylene chloride. The bottle was capped and rotated for 4 hours at room temperature. The resulting latex was an aqueously chlorinated methacrylonitrile polymer modified butyl rubber latex. If the small amount of methylene chloride present is objectionable such can be removed by vacuum stripping of the latex.

*Vulcanization Recipes*

The new aqueous dispersions of halogenated polymer modified isoolefin-multiolefin interpolymers hereof can be latex compounded by recipes set forth in Tables V and VI hereafter. For aqueous compounding of the aqueous dispersions hereof the compounding ingredients are prepared as aqueous dispersion by grinding with the aid of a dispersing agent (5 percent or less dispersing agent based on dry weight of material being dispersed) such as the polymerized sodium salt of alkyl naphthalene sulfonic acid (Daxad II, a trademarked product), isooctyl phenyl polyethoxy ethanol (Triton X-100 a trademarked product), dioctyl ester of sodium sulfosuccinic acid (Aerosol OT, a trademarked product), alkyl aryl sulfonate (Nacconol NR, a trademarked product) and other dispersing agents suitable for dispersing compound ingredients for latex compounding.

The resols employed in Table VI are described in more detail in Table VII hereafter. One skilled in the art of compounding will realize the numerous variations can be made including substitutions of other curing ingredients.

TABLE V
[Compounding recipes]

| Example V | A | B | C | D | E | F | G | H |
|---|---|---|---|---|---|---|---|---|
| Aqueously dispersed compounding ingredients (grams dry solids basis per 100 grams of halogenated polymer modified interpolymer): | | | | | | | | |
| Zinc Oxide | 5 | 5 | 5 | 4 | 5 | 5 | | 5 |
| Mercaptobenzothiazole | 0.5 | | 0.5 | 0.5 | 1.0 | | | |
| Tetraethylthiuram disulfide | 1.5 | 1.0 | 2 | 0.5 | | | 1.0 | |
| Sulfur | 2 | 2.2 | 2 | 2 | 2.2 | 2 | | 2.2 |
| Lead dioxide | | | | | | | 5 | |
| Quinone dioxime | | | | | | | 1.5 | |
| Benzothiazyl disulfide | | | | | | | 4 | |
| Magnesium oxide | | | | 2 | | | | |
| Cumar resin | | | | 5 | | | | |
| Tellurium diethyl dithiocarbamate | | 0.5 | | | | 1.5 | | 0.5 |
| Diethyl triamine | | | | | | | 2 | |

TABLE VI
[Compounding recipes]

| Example VI | A | B | C | D | E | F | G | H |
|---|---|---|---|---|---|---|---|---|
| Phenolic resin (see Table VII) type | A | B | C | D | E | F | G | H |
| Resol, g | 8 | 10 | 6 | 12 | 18 | 6 | 3 | 2 |
| Aqueous dispersed compounding ingredients (grams dry solids basis per 100 grams of halogenated polymer modified interpolymer): | | | | | | | | |
| Benzothiazyl disulfide | 1 | 1 | 1 | 0.5 | | | | 0.5 |
| Tellurium diethyl dithiocarbamate | 1 | 1 | 1 | | | | | |
| Sulfur | 1.5 | 1.5 | 1.5 | | 1 | 1 | 2 | |
| Zinc oxide | 5 | | | 5 | 5 | 4 | 4 | 7.5 |
| Stannous chloride | | 2 | | | | | | |
| Zinc chloride | | | 2 | | | | | |
| Diethylene triamine | | | | 4 | | | | |
| Formaldehyde | | | | | | | | |
| 2-Mercaptobenzothiazole | | | | 0.5 | 0.5 | 0.5 | 1 | |
| Tetraethylene thiuram disulfide | | | | 0.4 | 0.4 | 0.4 | 1.5 | |
| Magnesium oxide | | | | 2 | 2 | 2 | | |
| Tetraethyl thiuram monosulfide | | | | 0.25 | | | | 0.25 |

TABLE VII
[Resol composition]

| Resol VII | A | B | C | D | E | F | G |
|---|---|---|---|---|---|---|---|
| Phenol (moles): | | | | | | | |
| Bisphenol A | 1 | | | | | | |
| Bisphenol F | | 1 | | | | | |
| 4,4'-dihydroxy biphenyl | | | 1 | | | | |
| p-tert.-phenyl phenol | | | | 1 | | | |
| p-tert.-nonyl phenol | | | | | 1 | | |
| p-tert.-octyl phenol | | | | | | 1 | |
| p-tert.-butyl phenol | | | | | | | 1 |
| Aldehyde (moles): | | | | | | | |
| Formaldehyde | 2.1 | 2.1 | 2.3 | 2.2 | 2.2 | 2.3 | 2.1 |
| Alkali (moles): Sodium hydroxide | 2 | 2 | 2 | 1 | 1 | 1 | 1 |
| Reaction temp., °C | 50-75 | 50-75 | 50-75 | 50-75 | 50-75 | 50-75 | 50-75 |
| Neutralize [1] | x | x | x | x | x | x | x |
| Solvent (moles): | | | | | | | |
| Acetone | | | 5 | | | | |
| Ethanol | | | | 8 | | 4 | |
| Methyl ethyl ketone | | | | | 6 | 4 | |
| Dioxane | | | | | | | 5 |

[1] Add hydrochloric acetic acid or the like in molar amounts equivalent to sodium hydroxide added, however, this is not necessary if resol is to be used as sodium salt.

If the resol is to be aqueously dispersible then the condensation of the resol must be interrupted at a point where the resol is still solvent and soluble so that such can be emulsified in water with the aid of 5 to 10% more or less of emulsifier, e.g. non-ionic emulsifier such as polyoxyethylene lauryl alcohol (Brij 35, a trademark product).

In place of the phenolic resins (resols) employed in Examples A through H, Table VI, heretofore other alkylated phenol-formaldehyde resins in stage A or stage B may be employed including the primary and secondary as well as the tertiary $C_1$ through $C_{14}$ alkylated phenol-aldehyde resins including the aldehyde resins from alkylated phenols, alkylated with propylene, propylene dimer, propylene trimer, isobutylene, isobutylene dimer and isobutylene trimer and the like; which includes the resols of these $C_1$ to $C_{14}$ alkylated phenols and the like; further included are the aldehyde resins, e.g., formaldehyde resins of $C_1$ to $C_{14}$ alkylated phenols in which one or more hydrogens of the alkyl groups are substituted by a halogen group including fluoro, chloro, bromo or iodo groups preferably with the chloro or bromo group of combinations of these groups and this especially includes the chloromethyl and/or bromoethyl/alkylated phenols in which the alkyl group contains $C_1$ to $C_{14}$ carbons and including the resols thereof. For example the aldehyde resins, especially the formaldehyde resins from p-(chloroisobutyl) phenols, p-(bromo-isobutyl) phenols, p-(chloro-diisobutyl phenols, p-(bromo-diisobutyl) phenols and homologues of these. Like the phenolic resins the halogenated phenolic resins may be employed in this invention in the A stage or in the B stage.

Thus the halogenated phenolic resins, especially the chlorinated and/or brominated phenolic resins, provide halogen groups which can aid in the curing of the halogenated polymer modified isoolefin-multiolefin interpolymer hereof and their aqueous dispersions.

In the place of the phenolic resins (resols) employed in Examples A through H of Table VI heretofore, one may employ in about the same quantities as set forth in these examples, aminoplasts; as for example the condensation products of one mole of urea and two moles of formaldehyde modified to improve solubility in hydrocarbons by introduction of one to two moles or less of a suitable aliphatic alcohol into the urea-formaldehyde product and the alcohols which are suitable for this purpose include butyl, isobutyl, amyl, octyl, nonyl, capryl, decyl, tridecyl and higher alcohols. Similar products prepared from thiourea can likewise be employed together with the aldehyde and alcohols.

In place of the phenolic resin (resols) employed in Examples A through H of Table VI heretofore one may employ, in about the same quantities as set forth in the examples, a halogenated aminoplast; as for example the condensation product of one mole of urea with two moles of formaldehyde modified by introduction of a suitable halo-aliphatic alcohol into the urea-formaldehyde product in amounts of one or two moles or less. The halo-alcohols which are suitable for this purpose include 1-chloropentanol-5, 1-bromopentanol-5, 1-chloroctanol-8, 1-bromooctanol-8, 1-chlorononylol-9, 1-bromononylol-9, 1-chlorodecylol-10, 1-bromodecylol-10, other halogenated isomers of these $C_8$ to $C_{22}$ alcohols and including dichlorostearyl alcohol, dibromo-stearyl alcohol, dichloro capryl alcohol, chloro-bromo capryl alcohol, dibromocapril alcohol, dichloro-caprylyl alcohol, chloro-bromo-caprylyl alcohol, dibromo-caprylyl alcohol, dichloro-caproyl alcohol, choro-bromo caproyl alcohol, dibromocaproyl alcohol and like halogenated alcohols.

In Table VI, Examples A through H, in place of the phenolic resins employed one may employ in about similar amounts a halogenated or partially halogenated (especially with chlorine and/or bromine with or without other halogen groups) unsaturated polymer, especially a homo or multipolymer derived at least in part from a conjugated diene such as butadiene, isoprene, dimethyl butadiene, piperylene or other $C_4$ to $C_8$ conjugated diene. Thus the partially or completely chlorinated, brominated, chloro-brominated with or without other halogen groups unsaturated polymers include but are not limited to halogenated natural rubber, polybutadiene, butadiene-vinyl copolymers, especially the butadiene-styrene, the butadiene-vinyl toluene, the butadiene-acrylonitrile, butadiene-acrylate monomer copolymers, and similar polymers in which all or part of the butadiene is substituted by isoprene, piperylene and the like, including the chloro-butadiene polymers. When halogenating these unsaturated polymer latices, especially natural rubber latex, it may be necessary to add an emulsifier or additional emulsifier and the non-ionic emulsifiers suitable for stabilizing polymer emulsions are particularly useful.

When employing these halogenated polymer latices including chloroprene and bromoprene latex together with the halogenated polymer modified isoolefin-multiolefin interpolymer latices hereof, it is preferable to employ a metal oxide e.g., zinc oxide and/or magnesium oxide in amounts from 5 to 10 parts per 100 parts halogenated polymer modified interpolymer material hereof and further to aid in the curing hereof one may employ an amine, e.g., diethylene triamine or triethylene pentamine, mono-ethanolamine, diethanolamine, triethanolamine and the like. These halogenated polymer modified interpolymers hereof may also be employed in combination with the phenolic resins including halogenated phenolic resins and/or the aminoplasts including the halogenated aminoplasts.

Thus the aqueous dispersions of halogenated polymer modified issolefin-multiolefin interpolymer of this invention with or without other vulcanizable latices may be latex compounded, as set forth herein, and vulcanized to produce vulcanizates including vulcanized films, foam sponges and the like.

While there have been described herein what are at present considered preferred embodiments of the invention, it will be obvious to those skilled in the art that minor modifications and changes may be made without departing from the essence of the invention. It is therefore understood that the exemplary embodiments are illustrative and not restrictive to the invention, the scope of which is defined in the appended claims, and that all modifications that come within the meaning and range of equivalents of the claims are intended to be included therein.

We claim:

1. A process for the preparation of a modified polymer which consists in halogenating a polymer modified interpolymer material; said interpolymer material comprising polymerized $C_4$ to $C_8$ isoolefin in major proportion and polymerized $C_4$ to $C_{18}$ multiolefin in minor proportion; said interpolymer material having been polymer modified by the polymerization, in its presence, of monomer material containing at least one ethylenic double bond and polymerizable therethrough with the aid of a free radical generating catalyst; and said halogenating being effected by reacting said polymer modified interpolymer material with a halogenating agent.

2. A process according to claim 1 in which said halogenating agent provides said polymer modified interpolymer material with halogen groups at least in part selected from the class consisting of chloro-groups and bromo-groups.

3. A process according to claim 1 in which said halogenation of polymer modified interpolymer composition is carried out in a liquid organic diluent.

4. A process according to claim 1 which further comprises combining with water said halogenated polymer modified interpolymer composition, dispersed in liquid organic diluent, emulsifying said combination with the aid of an emulsifying agent, and removing at least a part of the liquid organic diluent.

5. A process according to claim 1 in which said halogenating is affected by reacting said halogenating agent with said polymer modified interpolymer material maintained in aqueous dispersion with the aid of an emulsifier at least in part selected from the group consisting of cationic and non-ionic emulsifiers.

6. A process according to claim 5 in which said halogenating agent provides said polymer modified interpolymer material with halogen groups at least in part selected from the class consisting of chloro-groups and bromo-groups.

7. A process which produces an aqueous dispersion of halogenated polymer modified interpolymer material, which process comprises two steps: (a) polymerizing monomer material in minor proportion in the presence of an aqueous dispersion of interpolymer material in major proportion and an emulsifier, said interpolymer material comprising polymerized $C_4$ to $C_8$ isoolefins in major proportions and polymerized $C_4$ to $C_{18}$ multiolefin in minor proportion, and said monomer material containing at least one ethylenic double bond and polymerizable therethrough with the aid of a free radical generating catalyst, and (b) halogenating said aqueous dispersion of polymer modified interpolymer material with the aid of a halogenating agent which provides halogen groups at least in part selected from the class consisting of chloro-groups and bromo-groups.

8. A process which produces an aqueous dispersion of halogenated polymer modified interpolymer, which process comprises two steps: (a) preparing an aqueous dispersion of polymer modified interpolyer by combining a liquid organic diluent dispersion of said polymer modified interpolymer with water and emulsifying the same with the aid of an emulsifying agent and removing the liquid organic diluent and (b) halogenating said aqueous dispersion of polymer modified interpolymer with the aid of a halogenating agent, said emulsifying agent essentially comprising emulsifier selected from the group consisting of cationic and non-ionic emulsifiers; said polymer modified interpolymer comprising an interpolymer of polymerized $C_4$ to $C_8$ isoolefin in major proportion and polymerized $C_4$ to $C_{18}$ multiolefin in minor proportion which has been polymer modified by polymerizing in its presence in major proportion, a minor proportion of monomer material containing at least one ethylenic double bond and polymerizable therethrough with the aid of a free radical generating catalyst.

9. A process which produces halogenated polymer modified interpolymer and which comprises the following steps: first forming the interpolymer by polymerizing isobutylene in major proportion and a $C_4$ to $C_5$ hydrocarbon conjugated diene in minor proportion together with a liquid organic diluent and with the aid of a Friedel-Crafts catalyst at temperatures below −100° F.; then neutralizing the catalyst; then adjusting the said interpolymer solids content to be within the range of 8–25 percent by weight by adjusting the diluent content of the resulting mixture; then raising the temperature of the resultant mixture to afford solution of said interpolymer in the liquid organic diluent; and also after formation of said interpolymer adding monomer material thereto in an amount less than said interpolymer and polymerizing same with aid of a free-radical generating catalyst, and then halogenating said polymer modified interpolymer with the aid of a halogenating agent capable of introducing halogen groups at least in part selected from the class consisting of chloro-groups and bromo-groups.

10. A process which produces halogenated polymer modified interpolymer in aqueous emulsion and which comprises the following steps: first forming the interpolymer by polymerizing isobutylene in major proportion and $C_4$ to $C_5$ hydrocarbon conjugated diene in minor proportion together with a liquid organic diluent and with the aid of a Friedel-Crafts catalyst at temperatures below −100° F.; then neutralizing the catalyst and adjusting the said interpolymer solids content to be within the range of 8–25 percent by weight by adjusting the liquid organic diluent content and then raising the temperature to afford solution of said interpolymer in the liquid organic diluent; and further, after formation of said interpolymer, polymer modifying the same by adding monomer material thereto in an amount less than the amount of said interpolymer and polymerizing same with aid of a free-radical generating catalyst, said added monomer material containing at least one ethylenic double bond and being polymerizable therethrough with the aid of such free radical generating catalyst; then halogenating said polymer modified interpolymer with the aid of a halogenating agent capable of introducing halogen groups at least in part selected from the class consisting of chloro-groups and bromo-groups; then adding water in amounts lying in the range from 2 to 9 times the weight of said halogenated polymer modified interpolymer; then emulsifying the resulting mixture with the aid of an emulsifier said emulsifier being selected from the class consisting of cationic, anionic, non-ionic, non-ionic with cationic and non-ionic with anionic emulsifiers, and said emulsifiers being employed within the range of 3 to 12% by weight of said halogenated polymer modified interpolymer; and then removing at least a part of said liquid organic diluent to form the aqueous dispersion.

11. A process for the preparation of an aqueously dispersed halogenated polymer modified interpolymer composition which comprises the following steps: first forming the interpolymer by polymerizing isobutylene in major proportion and a $C_4$ to $C_5$ hydrocarbon conjugated diene in minor proportion together with a liquid organic diluent and with the aid of a Friedel-Crafts catalyst at temperatures below −100° F.; after said polymerization has taken place adjusting the said interpolymer solids content to within the range of 8–25 percent by weight by adjusting the liquid organic diluent content of the mixture and then raising the temperature to afford solution of said interpolymer in the liquid organic diluent; then adding to said solution water in an amount of from 2 to 9 times the weight of said interpolymer, then forming an aqueous dispersion of said interpolymer and liquid organic diluent in said water with the aid of an emulsifier selected from the class consisting of cationic emulsifiers, non-ionic emulsifiers and combinations thereof, said emulsifier content being employed within the range of 3 to 12% by weight of said interpolymer; then removing at least in part the liquid organic diluent from said dispersion and then polymer modifying said interpolymer by adding monomer material thereto in an amount less than the amount of said interpolymer material and polymerizing the added monomer material with the aid of a free-radical catalyst, said added monomer material containing at least one ethylenic double bond and being polymerizable therethrough with the aid of such free radical generating catalyst; and then at least in part halogenating said polymer modified interpolymer aqueous dispersion with the aid of a halogenating agent, said halogenating agent providing said interpolymer with halogen groups at least in part selected from the class consisting of chloro-groups and bromo-groups.

12. A process for the preparation of an aqueous polymer dispersion which comprises forming a dilute aqueous dispersion of halogenated polymer modified interpolymer composition, said interpolymer of said halogenated polymer modified interpolymer composition comprises polymerized $C_4$ to $C_{18}$ isoolefin in major proportion and polymerized $C_4$ to $C_{18}$ multiolefin in minor proportion and having been modified by the polymerization, in its presence, of monomer material containing at least one ethylenic double bond and polymerizable therethrough with the aid of a free radical generating polymerization catalyst and halogenated by reaction with a halogenating agent; and concentrating said dilute aqueous dispersion to a solid content of at least 45% by weight with the aid of a creaming agent.

13. A halogenated, polymer modified, interpolymer product of which the interpolymer comprises polymerized $C_4$ to $C_8$ isoolefin in major proportion and polymerized $C_4$ to $C_{18}$ multiolefin in minor proportion; said interpolymer having such polymer modified by polymerization, in the presence thereof in major proportion of polymerizable monomer material in minor proportion, said monomer material containing at least one ethylenic double bond and polymerizable therethrough with the aid of a free radical generating catalyst; and said polymer modified interpolymer having been halogenated with halogen groups at least in part selected from the class consisting of chloro-groups and bromo-groups, by reaction thereof with at least one halogenating agent containing such halogen groups.

14. The product of claim 13, dispersed in a liquid diluent.

15. The product of claim 14, said diluent being an aqueous diluent.

16. The product of claim 15, having combined therewith in said aqueous dispersion a vulcanization aiding material selected from the class consisting of phenoplasts, aminoplasts, halogenated polymers at least in part from conjugated diene monomers, halogenated natural rubbers, and combinations of the foregoing.

17. A vulcanizable composition comprising a halogenated interpolymer composition according to claim 13 and a vulcanizing agent therefor.

18. The vulcanizate of the product of claim 17.

19. The combination of claim 16, at least a part of said vulcanization aiding material being itself a halogenated material.

20. The product of claim 15, having a halogenated phenoplast combined therewith in said aqueous dispersion.

21. The product of claim 15, having an aminoplast combined therewith in said aqueous dispersion.

22. The product of claim 15, having a halogenated aminoplast combined therewith in said aqueous dispersion.

23. The product of claim 15, having a polymer of halogen containing conjugated diene monomer combined therewith in said aqueous dispersion.

24. The product of claim 15, having a halogenated polymer from a mixture of conjugated diene and vinyl monomers combined therewith in said aqueous dispersion.

25. The product of claim 15, having a halogenated natural rubber combined therewith in said aqueous dispersion.

References Cited in the file of this patent

UNITED STATES PATENTS

| | | |
|---|---|---|
| 2,476,430 | Robbins | July 19, 1949 |
| 2,586,124 | Van Amerongen | Feb. 19, 1952 |
| 2,595,797 | Leyonmark et al. | May 6, 1952 |
| 2,609,365 | Scott | Sept. 2, 1952 |
| 2,631,984 | Crawford | Mar. 17, 1953 |
| 2,732,354 | Morrissey | Jan. 24, 1956 |
| 2,799,662 | Ernst et al. | July 16, 1957 |
| 2,883,351 | Uraneck et al. | Apr. 21, 1959 |
| 2,901,458 | Banes et al. | Aug. 25, 1959 |
| 2,943,664 | Baldwin et al. | July 5, 1960 |
| 2,965,620 | Serniuk et al. | Dec. 20, 1960 |

FOREIGN PATENTS

| | | |
|---|---|---|
| 746,692 | Great Britain | Mar. 21, 1956 |
| 793,581 | Great Britain | Apr. 16, 1958 |
| 1,145,258 | France | Oct. 24, 1957 |

OTHER REFERENCES

Van Amerongen (2): Industrial and Engineering Chemistry, volume 43, No. 11, November 1951, pages 2535–2540.